United States Patent
Laoui et al.

(10) Patent No.: US 10,843,940 B2
(45) Date of Patent: Nov. 24, 2020

(54) CONTAMINANT REMOVAL FROM WATER USING POLYELECTROLYTE COATED FLY ASH

(71) Applicant: King Fahd University of Petroleum and Minerals, Dhahran (SA)

(72) Inventors: Tahar Laoui, Dhahran (SA); Fatai Abidemi Olabemiwo, Dhahran (SA); Bassam Tawabini, Dhahran (SA); Mazen Khaled, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 16/022,000

(22) Filed: Jun. 28, 2018

(65) Prior Publication Data

US 2019/0330081 A1 Oct. 31, 2019

Related U.S. Application Data

(60) Provisional application No. 62/663,041, filed on Apr. 26, 2018.

(51) Int. Cl.

| | | |
|---|---|---|
| *B01J 20/20* | (2006.01) | |
| *B01J 20/18* | (2006.01) | |
| *B01J 20/282* | (2006.01) | |
| *B01J 20/32* | (2006.01) | |
| *C02F 1/28* | (2006.01) | |
| *B01J 20/28* | (2006.01) | |
| *C02F 101/22* | (2006.01) | |
| *C02F 103/16* | (2006.01) | |

(52) U.S. Cl.
CPC .............. *C02F 1/288* (2013.01); *B01J 20/20* (2013.01); *B01J 20/282* (2013.01); *B01J 20/28004* (2013.01); *B01J 20/28016* (2013.01); *B01J 20/28085* (2013.01); *B01J 20/3204* (2013.01); *B01J 20/3214* (2013.01);
(Continued)

(58) Field of Classification Search
CPC .................. B01J 20/20; B01J 20/28004; B01J 20/28016; B01J 20/28085; B01J 20/282; B01J 20/3204; B01J 20/3214; B01J 20/3248; B01J 20/3289; B01J 20/3293; B01J 2220/46; B01J 2220/4806;
(Continued)

(56) References Cited

U.S. PATENT DOCUMENTS 6,180,023 B1    1/2001   Amer
8,889,589 B2 * 11/2014   Li .................... B01J 20/28014
                                                                           502/402

FOREIGN PATENT DOCUMENTS

GB        1241962      8/1971

OTHER PUBLICATIONS

Gupta, G. and Torres, N., "Use of fly ash in reducing toxicity of and heavy metals in wastewater effluent", Journal of hazardous materials, 57, pp. 243-248. (Year: 1998).*

(Continued)

*Primary Examiner* — Benjamin L Lebron
(74) *Attorney, Agent, or Firm* — Oblon, McClelland, Maier & Neustadt, L.L.P.

(57) ABSTRACT

A polyelectrolyte coated fly ash is described with a method of making and a method of using for the adsorption of a contaminant from a solution. The polyelectrolyte coated fly ash may be made by treating the oil fly ash with acid, and then contacting the product with a positive polyelectrolyte to create a first polyelectrolyte layer, and then with a negative polyelectrolyte to create a negative polyelectrolyte layer. The resulting polyelectrolyte coated fly ash quickly adsorbs contaminants from solution, and may be cleaned and reused.

19 Claims, 14 Drawing Sheets

(52) U.S. Cl.
CPC ....... *B01J 20/3248* (2013.01); *B01J 20/3289* (2013.01); *B01J 20/3293* (2013.01); *C02F 1/283* (2013.01); *B01J 2220/46* (2013.01); *B01J 2220/4806* (2013.01); *C02F 2101/22* (2013.01); *C02F 2103/16* (2013.01)

(58) Field of Classification Search
CPC ...... C02F 1/283; C02F 1/288; C02F 2101/22; C02F 2103/16
See application file for complete search history.

(56) References Cited

OTHER PUBLICATIONS

Zhang, X., et al., "Polyelectrolyte-modified multi-walled carbon nanotubes for the adsorption of chronniunn(VI)", Analytical methods, 3, pp. 457-462. (Year: 2011).*

Kumar, R., and Bhattacharjee, B., "Porosity, pore size distribution and in situ strength of concrete", Cement and concrete research, 33, pp. 155-164. (Year: 2003).*

Olabemiwo, et al. ; Assessment of Cadmium (II) Removal from Water by Innovative Polyelectrolyte-Coated Fly Ash ; 15th International Conference on Environmental Science and Technology Presentation, Aug. 31, 2017 to Sep. 2, 2017 ; 5 Pages.

Chaiyasith, et al. ; Removal of Cadmium and Nickel From Aqueous Solution by Adsorption Onto Treated Fly Ash From Thailand ; Thammasat Int. Journal of Science and Technology, vol. 11, No. 2 ; Jan. 2006 ; 8 pages.

Joshi, et al. ; Optimization of Geopolymer Properties by Coating of Fly-Ash Microparticles with Nanoclays ; Journal of Inorganic and Organometallic Polymers, 25: 282-292 ; Oct. 2014 ; 12 Pages.

Li, et al. ; Synthesis of fly-ash cenospheres coated with polypyrrole using a layer-by-layer method ; Journal of Physics D: Applied Physics 44 (2011) ; Oct. 18, 2011 ; 6 pages.

\* cited by examiner

CONTAMINANT REMOVAL FROM WATER USING POLYELECTROLYTE COATED FLY ASH

CROSS REFERENCE TO RELATED APPLICATIONS

This application claims the benefit of priority from U.S. Provisional Application No. 62/663,041 filed Apr. 26, 2018, which is incorporated herein by reference in its entirety.

STATEMENT REGARDING PRIOR DISCLOSURES BY THE INVENTORS

Aspects of this technology were disclosed in a thesis defense titled "The Potential Capacity of Carbon Fly Ash Coated with Polyelectrolyte in Removing Cadmium from Contaminated Water," and presented by F. A. Olabemiwo on Apr. 26, 2017 at King Fahd University of Petroleum & Minerals (KFUPM), Dhahran, Saudi, and in the document F. A. Olabemiwo, B. S. Tawabini, F. Patel, T. A. Oyehan, M. Khaled, and T. Laoui, "Cadmium Removal from Contaminated Water Using Polyelectrolyte-Coated Industrial Waste Fly Ash," *Bioinorganic Chemistry and Applications*, 2017, Article ID 7298351, doi:10.1155/2017/7298351. Both disclosures are herein incorporated by reference in their entirety.

STATEMENT OF ACKNOWLEDGEMENT

This project was prepared with financial support from King Abdulaziz City for Science and Technology (KACST) through the Science & Technology Unit at King Fahd University of Petroleum & Minerals (KFUPM): Project no. 13-ADV161-04, as part of the National Science, Technology and Innovation Plan.

BACKGROUND OF THE INVENTION

Technical Field

The present invention relates to a porous polyelectrolyte coated fly ash that may be used to adsorb contaminants from an aqueous solution.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

In today's world, one issue of major concern is water pollution as the quality of water available for consumption greatly affects the health and wellbeing of humans and animals. Factors like industrialization, agricultural activities, urbanization, and population increase, among others, are likely reasons for decreases in water quality. See M. N. Chong, B. Jin, C. W. K. Chow, and C. Saint, "Recent developments in photocatalytic water treatment technology: a review," *Water Research*, vol. 44, no. 10, pp. 2997-3027, 2010; and G.-M. Zeng, X. Li, J.-H. Huang et al., "Micellar-enhanced ultrafiltration of cadmium and methylene blue in synthetic wastewater using SDS," *Journal of Hazardous Materials*, vol. 185, no. 2-3, pp. 1304-1310, 2011, each incorporated herein by reference in their entirety. The constant discharge of different pollutants such as organic compounds and heavy metals into the environment is causing growing concern to the entire world. Unlike most organic contaminants, heavy metals are mainly problematic because they accumulate in the tissues of living organisms and do not biodegrade, thereby leading to countless threats to the ecological environments and wellbeing of humans at large. See S. O. Lesmana, N. Febriana, F. E. Soetaredjo, J. Sunarso, and S. Ismadji, "Studies on potential applications of biomass for the separation of heavy metals from water and wastewater," *Biochemical Engineering Journal*, vol. 44, no. 1, pp. 19-41, 2009, incorporated herein by reference in its entirety. Common heavy metal contaminants primarily consist of cadmium, chromium, mercury, lead, cobalt, nickel, and so forth; these metallic ions are toxic and pose severe effects on human health.

Cadmium (Cd), a deadly heavy metal of work-related and environmental concern, has been recognized as teratogenic and carcinogenic to humans. The allowable limit for Cd in drinking water is set at 3.0 ppb by the World Health Organization (WHO). See WHO, "Guidelines for the safe use of wastewater, excreta and greywater," *World Health Organization*, vol. I, p. 95, 2006, incorporated herein by reference in its entirety. If ingested beyond the limit, Cd would likely cause kidney damage. Cd may be leached to the environment from industrial processes like smelting, alloy manufacturing, pesticides, and anthropogenic activities such as improper disposal of cigarettes, unused paints, fertilizers, and Ni/Cd batteries. See K. Rao, M. Mohapatra, S. Anand, and P. Venkateswarlu, "Review on cadmium removal from aqueous solutions," *International Journal of Engineering, Science and Technology*, vol. 2, no. 7, pp. 81-103, 2010, incorporated herein by reference in its entirety. Therefore, the removal of this heavy metal from contaminated water has become a task of paramount importance. For that, numerous methods such as membrane separation, ion exchange, coagulation, softening, solvent extraction, and adsorption have been employed. See F. A. Al-Khaldi, B. Abu-Sharkh, A. M. Abulkibash, and M. A. Atieh, "Cadmium removal by activated carbon, carbon nanotubes, carbon nanofibers, and carbon fly ash: a comparative study," *Desalination and Water Treatment*, vol. 53, no. 5, pp. 1417-1429, 2015, incorporated herein by reference in its entirety. Some of these techniques are effective but are not widely applicable to different pollutants and also generate chemical waste. Proper application of these techniques relies on the cadmium concentration and cost limitations. See R. Han, H. Li, Y. Li, J. Zhang, H. Xiao, and J. Shi, "Biosorption of copper and lead ions by waste beer yeast," *Journal of Hazardous Materials*, vol. 137, no. 3, pp. 1569-1576, 2006, incorporated herein by reference in its entirety. Mahvi & Bazrafshan (2007) applied electrocoagulation to remediate cadmium using an Al electrode. Simulated wastewater of different concentrations of cadmium was filled in a tank, and cadmium removal was measured at different pH (3, 7, and 10) and at electric potentials of 20, 30, and 40 volts. See A. H. Mahvi and E. Bazrafshan, "Removal of Cadmium from Industrial effluents by electrocoagulation process using aluminum electrodes," vol. 2, no. 1, pp. 34-39, 2007, incorporated herein by reference in its entirety. Their investigation showed that initial pH was lower than the final pH value. Numerous studies have used the adsorption mechanism for heavy metal removal using activated carbon owing to its very good adsorption features but with comparatively high operating cost. See K. G. Akpomie, F. A. Dawodu, and K. O. Adebowale, "Mechanism on the sorption of heavy metals from binary-solution by a low cost montmorillonite and its desorption potential," *Alexandria Engineering Journal*, vol. 54, no. 3, pp. 757-767, 2015; and M. Imamoglu et al., each incorporated herein by reference in their entirety. Therefore, the need has greatly increased to develop low-cost adsorbents for heavy metal removal from aqueous solutions. Adsorbents such as *Setaria* grass, sawdust, zeolite, clay, biomass, and fly ash have been used. See T. Vidhyadevi, A. Murugesan, S. S. Kalaivani et al., "Optimization of the process parameters for the removal of reactive yellow dye by the low cost *Setaria verticillata* carbon using response surface methodology: thermodynamic, kinetic, and equilibrium studies,"*Environmental Progress & Sustainable Energy*, vol. 33, no. 3, pp. 855-865, 2014; S. Larous, A.-H. Meniai, and M. Bencheikh Lehocine, "Experimental study of the removal of copper from aqueous solutions by adsorption using sawdust," *Desalination*, vol. 185, no. 1-3, pp. 483-490, 2005; E. Erdem, N. Karapinar, and R. Donat, "The removal of heavy metal cations by natural zeolites," *Journal of Colloid and Interface Science*, vol. 280, no. 2, pp. 309-314, 2004; K. G. Akpomie et al.; W. E. Marshall and E. T. Champagne, "Agricultural byproducts as adsorbents for metal ions in laboratory prepared solutions and in manufacturing wastewater," *Journal of Environmental Science and Health. Part A: Environmental Science and Engineering and Toxicology*, vol. 30, no. 2, pp. 241-261, 1995; H. Aydin, Y. Bulut, and C., Yerlikaya, "Removal of copper (II) from aqueous solution by adsorption onto low-cost adsorbents," *Journal of Environmental Management*, vol. 87, no. 1, pp. 37-45, 2008; F. A. Al-Khaldi et al.; A. Papandreou, C. J. Stournaras, and D. Panias, "Copper and cadmium adsorption on pellets made from fired coal fly ash," *Journal of Hazardous Materials*, vol. 148, no. 3, pp. 538-547, 2007; M. Visa and A. Duta, "Cadmium and nickel removal from wastewater using modified fly ash?: Thermodynamic and kinetic study," *Sci. Stu. and Res*, vol. IX, no. 1, pp. 73-82, 2008; G. Gupta and N. Tones, "Use of fly ash in reducing toxicity of and heavy metals in wastewater effluent," *Journal of Hazardous Materials*, vol. 57, no. 1-3, pp. 243-248, 1998; and F. A. Olabemiwo, "The Potential Capacity of Polyelectrolyte coated Carbon Fly Ash in Removing Cadmium from Contaminated water," *King Fahd University of Petroleum and Minerals*, 2017, each incorporated herein by reference in their entirety.

Fly ash (FA) is one of the major wastes from power stations that cannot be cheaply disposed. Recent research efforts have consequently focused on developing ways to make use of FA in applications that are friendly to the environment. Apart from its limited applications in cement and concrete industries, reuse of fly ash in environmental applications takes advantage of fly ash's reasonable adsorptive property for some water pollutants. Al-Khaldi et al. conducted a comparative study on Cd adsorption using activated carbon, CNT, CNF, and fly ash. They found out that, at pH 7 in 120 min with 50 mg and 150 rpm, percent removal of 95, 27, 34, and 38% was attained for fly ash, CNT, CNF, and activated carbon, respectively. See R. Han et al., incorporated herein by reference in its entirety. However, the efficiency of the FA for removing water pollutants was limited in a few previous studies and, therefore, there is a need to improve its adsorption efficiency. See G. Gupta et al., incorporated herein by reference in its entirety.

In view of the forgoing, one objective of the present invention is to provide a polyelectrolyte coated fly ash, a method of making, and a method of using to adsorb heavy metal contaminants from aqueous solutions.

BRIEF SUMMARY OF THE INVENTION

According to a first aspect, the present disclosure relates to a polyelectrolyte coated fly ash, comprising an acid-treated fly ash particle, a first layer of a positive polyelectrolyte, where the first layer is in contact with the acid-treated fly ash particle, and a second layer of a negative polyelectrolyte, where the second layer is in contact with the first layer. The polyelectrolyte coated fly ash is in the form of porous particles having an average particle diameter of 15-100 µm and an average pore diameter of 0.5-10 µm.

In one embodiment, the acid-treated fly ash particle is derived from an oil fly ash.

In one embodiment, the first layer and the second layer each independently have an average thickness of 0.5-10 nm.

In one embodiment, the polyelectrolyte coated fly ash further comprises alternating layers of positive polyelectrolyte and negative polyelectrolyte, for a total of at least 4 layers.

In one embodiment, the positive polyelectrolyte comprises a heterocyclic amine monomer.

In one embodiment, the positive polyelectrolyte is poly (diallyldimethylammonium chloride) (PDADMAC).

In one embodiment, the negative polyelectrolyte comprises a sulfonate monomer.

In one embodiment, the negative polyelectrolyte is polystyrene sulfonate (PSS).

According to a second aspect, the present disclosure relates to a method of making the polyelectrolyte coated fly ash of the first aspect. This method involves refluxing an oil fly ash in an inorganic acid 6-36 hours to produce a refluxed mixture. The refluxed mixture is washed and dried to produce an acid-treated fly ash. The acid-treated fly ash is mixed with a first aqueous solution of the positive polyelectrolyte to produce a fly ash with the first layer and the fly ash with the first layer is mixed with a second aqueous solution of the negative polyelectrolyte to produce the polyelectrolyte coated fly ash.

In one embodiment, the oil fly ash comprises porous particles having an average pore diameter of 0.5-12 µm.

In one embodiment, the first aqueous solution and the second aqueous solution do not comprise an additional electrolyte.

According to a third aspect, the present disclosure relates to a method of reducing a contaminant concentration from an aqueous solution with the polyelectrolyte coated fly ash of the first aspect. This method involves mixing the polyelectrolyte coated fly ash with the aqueous solution comprising the contaminant at a contaminant concentration of 0.5-50 mg/L. Here, a concentration of the polyelectrolyte coated fly ash in the aqueous solution after the mixing is 1-10 g/L, and the polyelectrolyte coated fly ash reduces the contaminant concentration in the aqueous solution by adsorption.

In one embodiment, the contaminant is at least one metal selected from the group consisting of Cd, Pb, Cr, Se, Hg, As, Mn, Ni, Cu, Zn, Ag, Tl, and Sb.

In one embodiment, at least 90 wt % of the contaminant is adsorbed by the polyelectrolyte coated fly ash in at least 20 minutes.

In one embodiment, the polyelectrolyte coated fly ash adsorbs an amount of contaminant that is greater by a factor of 1.2-3.5 than a contaminant adsorbed by an essentially similar acid-treated fly ash not having a polyelectrolyte layer.

In one embodiment, the aqueous solution has a pH of 8-10.

In one embodiment, the polyelectrolyte coated fly ash has an adsorption capacity of 0.5-200 mg of the contaminant per g of the polyelectrolyte coated fly ash.

In one embodiment, the mixing involves stirring or agitating the polyelectrolyte coated fly ash in the aqueous solution at a rate of 130-200 rpm.

In one embodiment, the method further comprises removing the polyelectrolyte coated fly ash from the aqueous solution to produce a recovered polyelectrolyte coated fly ash. The recovered polyelectrolyte coated fly ash is mixed with an acidic solution. The acidic solution is dried to produce a cleaned polyelectrolyte coated fly ash. The cleaned polyelectrolyte coated fly ash is reused and maintains an adsorption capacity for at least 5 purification cycles.

In one embodiment, the acidic solution comprises one or more inorganic acids at a total concentration of 0.05-0.5 M.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1A:
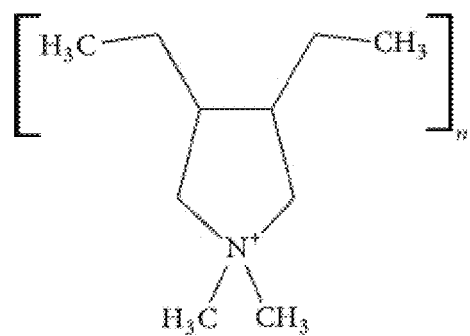
FIG. 1A shows the structure of poly(diallyldimethylammonium chloride (PDADMAC).

Embodiments of the present disclosure will now be described more fully hereinafter with reference to the accompanying drawings, in which some, but not all embodiments of the disclosure are shown.

The present disclosure will be better understood with reference to the following definitions. As used herein, the words "a" and "an" and the like carry the meaning of "one or more." Within the description of this disclosure, where a numerical limit or range is stated, the endpoints are included unless stated otherwise.

As used herein, the words "about," "approximately," and "substantially similar" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), +/−15% of the stated value (or range of values), or +/−20% of the stated value (or range of values). Within the description of this disclosure, where a numerical limit or range is stated, the endpoints are included unless stated otherwise. Also, all values and subranges within a numerical limit or range are specifically included as if explicitly written out.

As used herein, "compound" is intended to refer to a chemical entity, whether as a solid, liquid, or gas, and whether in a crude mixture or isolated and purified.

As used herein, "composite" refers to a combination of two or more distinct constituent materials into one. The individual components, on an atomic level, remain separate and distinct within the finished structure. The materials may have different physical or chemical properties, that when combined, produce a material with characteristics different from the original components. In some embodiments, a composite may have at least two constituent materials that comprise the same empirical formula but are distinguished by different densities, crystal phases, or a lack of a crystal phase (i.e. an amorphous phase).

The present disclosure is intended to include all hydration states of a given compound or formula, unless otherwise noted or when heating a material. For example, $Ni(NO_3)_2$ includes anhydrous $Ni(NO_3)_2$, $Ni(NO_3)_2 \cdot 6H_2O$, and any other hydrated forms or mixtures. $Cd^{2+}$ includes $Cd^{2+}$ and $[Cd(H_2O)_6]^{2+}$.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium. Isotopes of carbon include $^{13}C$ and $^{14}C$. Isotopes of nitrogen include $^{14}N$ and $^{15}N$. Isotopes of oxygen include $^{16}O$, $^{17}O$, and $^{18}O$. Isotopes of cadmium include $^{106}Cd$, $^{108}Cd$, $^{110}Cd$, $^{111}Cd$, $^{112}Cd$, $^{114}Cd$, and $^{116}Cd$. Isotopically-labeled compounds of the disclosure may generally be prepared by conventional techniques known to those skilled in the art or by processes analogous to those described herein, using an appropriate isotopically-labeled reagent in place of the non-labeled reagent otherwise employed.

According to a first aspect, the present disclosure relates to a polyelectrolyte coated fly ash, comprising an acid-treated fly ash particle. In one embodiment, the acid-treated fly ash particle originates or is derived from an oil fly ash. Oil fly ash may also be called liquid fuel fly ash, heavy liquid fuel fly ash, or heavy oil fly ash. In other embodiments, the acid-treated fly ash particle may instead be derived from a coal fly ash or a wood fly ash.

Fly and bottom ash are generated upon burning coal, heavy fuel oil, or other fossil fuels and are thus byproducts of power generation from petroleum sources. In such power plants, fly ash of variable particle diameters are emitted, leaving the bottom ash in the combustor. Fly ash may be separated from the emissions with an electrostatic precipitator, and the recovered fly ash may be directly discharged into landfills and ash ponds or used in concrete or other construction materials.

The chemical composition of fly ash is dependent upon the nature of the feeding fuel, (e.g., coal, petroleum, or sometimes wood) and each fuel source provides distinct chemical compositions and properties to the resulting fly ash. Fly ash which is derived from coal sources such as bituminous coal, sub-bituminous coal, and lignite is termed "coal fly ash", and is characterized by high contents of $SiO_2$, $Al_2O_3$, $Fe_2O_3$, and CaO. According to ASTM C618, coal fly ash is categorized into Class F or Class C based on the content of Si, Al, and Ca. Coal fly ash can be categorized as siliceous fly ash or calcareous fly ash, depending on the amount of Si or Ca present, respectively. Coal fly ash also has a low carbon content, less than 15 wt %, and in many cases less than 5 wt %, as determined by loss on ignition (LOI) values according to ASTM D7348 for example, or TGA-MS analysis. Fly ash of coal origin may also contain trace metals such as As, Be, B, Cd, Cr, Co, Mg, Mo, Pb, Se, V, Ni, Cu, and Zn.

Wood fly ash, or fly ash obtained from combustion of wood or wood-based biomass varies depending of the wood source. However, most wood fly ash contains a high calcium and silica content. Other waste wood combustion materials, in addition to wood fly ash, similarly have high silica and CaO contents.

Oil fly ash, which is obtained from combustion of oil-based sources such as heavy oil, diesel, and natural gas sources in power stations or water desalination plants, differs greatly in composition from coal and wood fly ash. Some exemplary oil sources include, but are not limited to, residual fuel oil, light Arabian crude oil, and heavy Arabian crude oil. Compared to coal and wood fly ash, oil fly ash has a high carbon content and a low content of Si, Al, and Ca, as determined, for example, by X-ray diffraction, ASTM D7348, and/or ASTM C618 See Al-Malack et al. Characteristics of Fly ash Produced at Power and Water Desalination Plants Firing Fuel Oil, Int. J. Environ. Res., 2013, 7(2), 455-466—incorporated herein by reference in its entirety.

In alternative embodiments, other particles may be used in place of the oil fly ash particles. For instance, cenospheres may be used. A cenosphere is a lightweight, inert, hollow spherical particle made largely of silica and alumina and filled with air or inert gas, typically produced as a byproduct of coal combustion. Other particles, for instance, comprising fumed silica, clay, asphaltene, layered double hydroxide, ceramic, may be used in place of the fly ash.

In some embodiments, the oil fly ash employed herein (and thus the resultant polyelectrolyte coated fly ash produced herein) has a carbon content of greater than 50 wt %, preferably greater than 60 wt %, preferably greater than 70 wt %, based on a total weight of the oil fly ash. Oil fly ash (and thus the polyelectrolyte coated fly ash produced herein) has a higher carbon content than other types of fly ash, but a lower carbon content than that of carbonaceous combustion products such as carbon black, which has a carbon content of 96-99.5 wt % (and only 0.2-0.5 wt % of oxygen containing materials).

In some embodiments, the oil fly ash (and thus the polyelectrolyte coated fly ash produced herein) has a $SiO_2$ content of less than 3 wt %, preferably less than 2 wt %, preferably less than 1 wt %, preferably less than 0.9 wt %, based on a total weight of the oil fly ash.

In some embodiments, the oil fly ash (and thus the resultant polyelectrolyte coated fly ash produced herein) has an $Al_2O_3$ content of less than 3 wt %, preferably less than 2.5 wt %, based on a total weight of the oil fly ash.

In some embodiments, the oil fly ash (and thus the resultant polyelectrolyte coated fly ash produced herein) has a CaO content of less than 3 wt %, preferably less than 2 wt %, preferably less than 1 wt %, based on a total weight of the oil fly ash.

In some embodiments, the oil fly ash (and thus the resultant polyelectrolyte coated fly ash produced herein) has a MgO content of 1-16 wt %, preferably 2-15 wt %, preferably 3-10 wt %, based on a total weight of the oil fly ash. However, in other embodiments, the oil fly ash may comprise less than 1 wt % MgO.

Other oxides that may be present in the oil fly ash used herein (and thus the resultant polyelectrolyte coated fly ash produced herein) include, but are not limited to, $Fe_2O_3$ and $Na_2O$, in amounts of 0.1-4 wt %, preferably 0.5-4.5 wt %, more preferably 2-4 wt %, each based on a total weight of the oil fly ash. Other compounds present in the oil fly ash may include, but are not limited to, S, V, Ni, Mo, Zn, Mn, and Cu, as well as other trace metals mentioned previously for coal fly ash and wood fly ash.

In one embodiment, the oil fly ash is in the form of porous particles having an average particle diameter of 10-120 μm, preferably 15-100 μm, more preferably 30-80 μm, even more preferably 40-60 μm. However, in some embodiments, the oil fly ash may have an average particle diameter of smaller than 10 μm or greater than 120 μm. The oil fly ash may have an average pore diameter of 0.5-12 μm, preferably 0.8-10 μm, more preferably 2-8 μm, even more preferably 3-7 μm.

Likewise, in one embodiment, the polyelectrolyte coated fly ash is in the form of porous particles having an average particle diameter of 15-100 μm, preferably 30-80 μm, more preferably 40-60 μm. However, in some embodiments, the polyelectrolyte coated fly ash may have an average particle diameter of less than 15 μm or greater than 100 μm. A diameter of the particle, as used herein, refers to the longest linear distance measured from one point on the particle through a central region of the particle to a point directly across from it. The polyelectrolyte coated fly ash may have an average pore diameter of 0.5-10 μm, preferably 2-8 μm, more preferably 3-7 μm, though in some embodiments, the polyelectrolyte coated fly ash may have an average pore diameter of less than 500 nm or greater than 10 μm.

In one embodiment, the polyelectrolyte coated fly ash may have a specific surface area of 100-5,000 $m^2/g$, preferably 200-1,000 $m^2/g$, more preferably 300-800 $m^2/g$, even more preferably 350-750 $m^2/g$. Here, the specific surface area may be determined by Brunauer-Emmett-Teller (BET) analysis of $N_2$ adsorption isotherms, though other techniques may be used, such as mercury intrusion porosimetry. However, in some embodiments, the polyelectrolyte coated fly ash may have a specific surface area of less than 100 $m^2/g$ or greater than 5,000 $m^2/g$.

In one embodiment, the polyelectrolyte coated fly ash may have a density of 1.5-3.5 $g/cm^2$, preferably 1.8-3.0 $g/cm^2$, more preferably 2.0-2.8 $g/cm^2$. However, in other embodiments, the polyelectrolyte coated fly ash may have a density of less than 1.5 $g/cm^2$ or greater than 3.5 $g/cm^2$.

The polyelectrolyte coated fly ash may have a void volume or porosity of 20-80%, preferably 25-70%, more preferably 30-60%, though in some embodiments, the polyelectrolyte coated fly ash may have a void volume or porosity of less than 20% or greater than 80%.

In one embodiment, the polyelectrolyte coated fly ash and the oil fly particles ash may have a spherical or substantially spherical shape (i.e., where the sides are rounded or well-rounded) with a sponge-like (i.e., porous) appearance. As defined here, having a substantially spherical shape means that the distance from the particle centroid (center of mass) to anywhere on the particle outer surface varies by less than 30%, preferably by less than 20%, more preferably by less than 10% of the average distance.

In some embodiments, a portion of polyelectrolyte coated fly ash and oil fly ash particles may be angular (corners sharp and jagged), angular, sub-angular, or sub-rounded and possess a jagged flake-like morphology.

In one embodiment, some oil fly ash particles and/or some polyelectrolyte coated fly ash particles may be in the form of a shell surrounding a hollow core. Here, the shell may surround 30-40%, 40-50%, 50-60%, 60-70%, or 70-80% of the hollow core. In this embodiment, preferably pores in the shell lead to the interior void volume. The shell may have an average thickness of 1-10 μm, preferably 2-8 μm, though in some embodiments, the shell may have an average thickness of less than 1 μm or greater than 10 μm. Preferably polyelectrolyte coated fly ash particles in the form of a shell surrounding a hollow core comprise one or more layers of polyelectrolytes within the interior sides of the shell.

In one embodiment, the oil fly ash particles and/or the polyelectrolyte coated fly ash particles are monodisperse, having a coefficient of variation or relative standard deviation, expressed as a percentage and defined as the ratio of the particle diameter standard deviation (σ) to the particle diameter mean (μ), multiplied by 100%, of less than 25%, preferably less than 10%, preferably less than 8%, preferably less than 6%, preferably less than 5%. In one embodiment, the oil fly ash particles and/or the polyelectrolyte coated fly ash particles are monodisperse, having a particle diameter distribution ranging from 80% of the average particle diameter to 120% of the average particle diameter, preferably 85-115%. In another embodiment, the oil fly ash particles and/or the polyelectrolyte coated fly ash particles are not monodisperse, for instance, they may be considered polydisperse. Here, the coefficient of variation may be greater than 25%, or greater than 37%. In one embodiment, the oil fly ash particles and/or the polyelectrolyte coated fly ash particles are polydisperse with a particle diameter distribution ranging from 70% of the average particle diameter to 130% of the average particle diameter, preferably ranging from 60-140%, more preferably 50-150%.

An oil fly ash and the polyelectrolyte coated fly ash derived from it may have substantially similar geometries and parameters as discussed above, or may have one or more geometries or parameters that are different. For instance, a polyelectrolyte coated fly ash may have a specific surface area that is 10-70% lower, or 20-60% lower than a specific surface area of the oil fly ash from which it was derived, relative to the specific surface area of the oil fly ash. In another embodiment, an oil fly ash may have an average particle diameter that is 10-40% smaller, or 15-30% smaller than an average particle diameter of a polyelectrolyte coated fly ash, relative to the average particle diameter of the polyelectrolyte coated fly ash. In one embodiment, acid-treated fly ash particles have a geometric parameter, such as average particle diameter or average pore size, that is between that of the polyelectrolyte coated fly ash and the oil fly ash. In another embodiment, an acid-treated fly ash has a geometric parameter that is similar to the oil fly ash or to the polyelectrolyte coated fly ash. However, in some embodiments, an acid-treated fly ash may have a pore size or some other parameter which is not between that of an oil fly ash and a polyelectrolyte coated fly ash. For instance, an acid-treated fly ash may have an average pore size that is larger than that of an oil fly ash and a polyelectrolyte coated fly ash.

As used herein, "polyelectrolyte" refers to both cationic polyelectrolytes (positive polyelectrolytes) and anionic polyelectrolytes (negative polyelectrolytes). In one embodiment, a single species of polyelectrolyte may be either a cationic or anionic polyelectrolyte depending on the pH of its environment.

The positive (cationic) and negative (anionic) polyelectrolytes may be at least one selected from the group consisting of poly(2-acrylamido-2-methyl-1-propane sulfonic acid), poly(acrylamido-N-propyltrimethylammonium chloride), poly(styrene sulfonate), polyaniline, poly(styrene nitrate), poly(acrylic acid) (PAA), poly(2-acrylamido-2-methyl-1-propanesulfonic acid-co-acrylonitrile) acrylonitrile, polyanetholesulfonic acid, polyaspartic acid, poly(sodium 4-styrenesulfonate), polyethyleneimine (PEI), poly (acrylamido-N-propyltrimethylammonium chloride) (PAPTAC), poly(4-styrenesulfonic acid-co-maleic acid), poly(vinyl sulfate), poly(vinyl amine), a protein, a polysaccharide, quaternary cationic polyelectrolytes (ammonium, sulfonium, and phosphonium), poly((dimethylamino)ethylmethacrylate) (PAMA), poly(allylamine hydrochloride) (PAH), polypyridinium, polypyrrole, poly(diallyl dimethyl-ammonium chloride) (PDADMAC), epichlorohydrin dimethylamine polyamine (EPI-DMA), (poly(acrylamide-co-diallyldimethylammonium chloride), poly(L-glutamic acid) (PGA), poly(L-lysine) (PLL), poly(methacrylic acid) (PMA), poly(vinyl pyridine) (PVP), a structural derivative of the foregoing, or combinations thereof. The polyelectrolyte may be commercial preparation, including, but not limited to ACUSOL, ACUMER, ACRYSOL, ALCOSPERSE, RESONIUM, SORBISTERIT, RESIKALI, DURAMAX, TAMOL, ROMAX, DOWEX, DISPEX, MAGNAFLOC, RHEOSLOVE, and TERRABLEND.

In one embodiment, a polyelectrolyte has a weight average molecular weight of 20-500 kDa, preferably 40-450 kDa, more preferably 60-350 kDa, though in some embodiments, a polyelectrolyte may have a weight average molecular weight of less than 20 kDa or greater than 500 kDa. In another embodiment, a polyelectrolyte may have a number average molecular weight within those values.

In one embodiment, a polyelectrolyte may be branched or cross-linked, rather than linear. In another embodiment, a polyelectrolyte may be a mixture of both branched and linear molecules.

Dispersity is a measure of the heterogeneity of sizes of molecules or particles in a mixture. The polydispersity index (PDI or heterogeneity index) is a measure of the distribution of molecular mass in a given polymer sample. The PDI is calculated as the weight average molecular weight divided by the number average molecular weight. Typically, dispersities vary based on the mechanism of polymerization and may be affected by a variety of reaction conditions such as reactant ratios, or the extent of the polymerization reaction. Generally, a decreasing molecular weight distribution increases water solubility and increase flexibility. It can further affect properties of a polyelectrolyte including crystallizability, adhesion, mechanical strength, and diffusivity. In one embodiment, a polyelectrolyte may have a PDI of up to 6, preferably up to 5, preferably up to 3, preferably up to 2.5, preferably up to 2, preferably up to 1.5, preferably up to 1.25.

The degree of polymerization (DP) is defined as the number of monomeric units in a macromolecule or polymer. In one embodiment, a polyelectrolyte may have a degree of polymerization of 100-2500, preferably 100-1500, preferably 100-750, preferably 100-300. However, in some embodiments, a polyelectrolyte may have a degree of polymerization of less than 100 or greater than 2500.

In one embodiment, the positive polyelectrolyte comprises a heterocyclic amine monomer. In a further embodiment, the positive polyelectrolyte is poly(diallyldimethylammonium chloride) (PDADMAC, FIG. 1A). In this embodiment, the PDADMAC may have a weight average molecular weight of 100-500 kDa, preferably 120-450 kDa, more preferably 150-400 kDa, even more preferably 180-370 kDa. In another embodiment, the PDADMAC may have a number average molecular weight within those values. However, in other embodiments, the PDADMAC may have a molecular weight (weight average molecular weight and/or number average molecular weight) of less than 100 kDa or greater than 500 kDa.

Figure 1B:
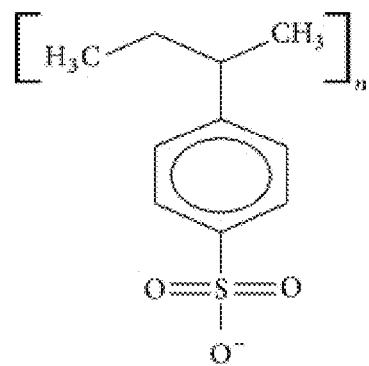
FIG. 1B shows the structure of polystyrene sulfonate (PSS).

In one embodiment, the negative polyelectrolyte comprises a sulfonate monomer. In a further embodiment, the negative polyelectrolyte is polystyrene sulfonate (PSS, FIG. 1B). In this embodiment, the PSS may have a weight average molecular weight of 10-140 kDa, preferably 20-110 kDa, more preferably 40-100 kDa, even more preferably 50-85 kDa. In another embodiment, the PSS may have a number average molecular weight within those values. However, in other embodiments, the PSS may have a molecular weight (weight average molecular weight and/or number average molecular weight) of less than 10 kDa or greater than 140 kDa.

In one embodiment, a polyelectrolyte layer may be doped with additives including, but not limited to, crosslinkers, defoamers, surfactants, photocatalysts, dispersants, biocides, and plasticizers.

In another embodiment, positive or negatively charged molecules may be used in place of a polyelectrolyte. For instance, these molecules may be the monomer units of the previously mentioned polymers, or an oligomer of those monomer units.

In one embodiment, the first layer and the second layer each independently have an average thickness of 0.5-10 nm, preferably 0.8-7 nm, more preferably 1.0-5 nm, even more preferably 1.2-4.5 nm. However, in some embodiments, the first layer and the second layer may have independent average thicknesses of less than 0.5 nm or greater than 10 nm. In one embodiment, the average thickness of the first layer and the average thickness of the second layer may have similar values, for instance, one may be within 10% or within 5% of the other. In another embodiment, the average thicknesses may be different, for instance, the ratio of the average thicknesses of one layer to the other may be 1:2-1:20, preferably 1:3-1:15, more preferably 1:4-1:12. In one embodiment, the first layer and/or the second layer may have thicknesses with a low variance, for instance, 90% or more of the layer may have a thickness within 10% of the average thickness. Preferably, the first and second layers extend into or are located within the pores of the fly ash particle.

In one embodiment, the first layer is in contact with the acid-treated fly ash particle, and 50-95%, preferably 60-92%, more preferably 70-90% of the surface area of the particle is in contact with the first layer. However, in some embodiments, less than 50% or greater than 95% of the surface area of the particle may be in contact with the first layer. Here, the surface area of the particle comprises the outer surface, the interior sides and edges of the pores, and any inside cavity surfaces in fluid communication with at least one pore. In one embodiment, the surfaces of the inside cavities may have a lower percentage in contact with the first layer as compared to the outer surface. In another embodiment, 70-100%, more preferably 80-96%, of the outer surface of the acid-treated fly ash particle is in contact with the first layer. In some embodiments, where a lower percentage of the surface area is in contact with the first layer, for example, less than 60% surface area, preferably less than 40% surface area, the first layer may not have one contiguous surface itself, but may instead be in separate regions, patches, or islands on the particle.

In one embodiment, the second layer is in contact with the first layer, where the first layer is in contact with the acid-treated fly ash particle as previously mentioned. The second layer may similarly be located on 50-95%, preferably 60-92%, more preferably 70-90% of the surface area of the particle, where the surface area comprises outer surface, the interior sides and edges of the pores, and any inside cavity surfaces in fluid communication with at least one pore. In some embodiments, less than 50% or more than 95% of the particle surface may be in contact with the second layer. Preferably at least 80%, more preferably at least 90% of the second layer is attached directly to the first layer, however, some amount of the second layer may be attached directly to the surface of the acid-treated fly ash particle, for instance, when the coverage of the first layer is lower. The second layer may also exist as patches or islands, and may have a lower percentage coverage within pores and cavities as compared to the outside of the particle.

In one embodiment, the polyelectrolyte coated fly ash further comprises alternating layers of positive polyelectrolyte and negative polyelectrolyte, for a total of at least 4 layers. In other embodiments, the polyelectrolyte coated fly ash may comprise alternating layers of positive polyelectrolyte and negative polyelectrolyte for a total of 5-7 layers, 8-10 layers, 11-13 layers, 14-16 layers, 17-22 layers, or 4-20, 5-20 layers. In one embodiment, the polyelectrolyte coated fly ash may comprise 5 layers or more than 20 layers, such as 40 layers.

In the embodiments where the polyelectrolyte coated fly ash comprises more than one layer of positive polyelectrolyte, the positive polyelectrolyte may be the same chemical composition or a different chemical composition, and have a similar layer thickness or a different layer thickness.

In the embodiments where the polyelectrolyte coated fly ash comprises more than one layer of negative polyelectrolyte, the negative polyelectrolyte may be the same chemical composition or a different chemical composition, and have a similar layer thickness or a different layer thickness.

In one embodiment, a layer of a negative polyelectrolyte may comprise a mixture of two or more negative polyelectrolytes. In another embodiment, a layer of a positive polyelectrolyte may comprise a mixture of two or more positive polyelectrolytes.

In an alternative embodiment, the polyelectrolyte coated fly ash may have only one polyelectrolyte layer, having either a net positive or negative charge. In another embodiment, a polyelectrolyte layer may comprise a neutral or nonionic polymer.

In another embodiment, where the polyelectrolyte coated fly ash has more than two polyelectrolyte layers, the outermost layer may comprise a positive electrolyte or a negative electrolyte. In an alternative embodiment, polyelectrolyte coated fly ash particles of both positive and negative outer layers may be mixed and used together.

According to a second aspect, the present disclosure relates to a method of making the polyelectrolyte coated fly ash of the first aspect. This method involves refluxing an oil fly ash in an inorganic acid. In one embodiment, the oil fly ash comprises porous particles having an average pore diameter of 0.5-12 µm, preferably 0.8-10 µm, more preferably 2-8 µm, even more preferably 3-7 µm.

The oil fly ash may be refluxed for 6-36 hours, preferably 12-34 hours, more preferably 18-30 hours, or about 24 hours, to produce a refluxed mixture. In other embodiments, the oil fly ash may be refluxed for less than 6 hours or for longer than 36 hours. The inorganic acid may be nitric acid, sulfuric acid, hydrochloric acid, hydrobromic acid, phosphoric acid, or some other inorganic acid. Preferably the acid is nitric acid. The acid may have a concentration of 0.1-2 M, preferably 0.5-1.5 M, or about 1.0 M, though in some embodiments, the acid may have a concentration lower than 0.1 M or greater than 2 M. In an alternative embodiment, the oil fly ash may instead be refluxed in an organic acid, such as acetic acid. In another alternative embodiment, the oil fly ash may be refluxed in a basic solution such as sodium hydroxide. The mass ratio of the oil fly ash to the inorganic acid may be 1:10-1:2, preferably 1:5-1:2.5, or about 1:3. In one embodiment, the oil fly ash may be allowed to soak in the inorganic acid for 0.5-3 hours, preferably 1-2 hours at room temperature before the refluxing.

The oil fly ash may be refluxed at a temperature of 90-130° C., preferably 100-125° C., or about 110° C. However, in some embodiments, depending on the refluxing mixture and pressure, the oil fly ash may be refluxed at a temperature below 90° C. or above 130° C. In an alternative embodiment, the oil fly ash may not necessarily be refluxed, but instead contacted or mixed with an acid, with or without heating.

Before the refluxing, an oil fly ash may be washed one or more times with water and then dried. For instance, an oil fly ash may be mixed with water at a concentration of 0.05-0.50 g/mL, preferably 0.10-0.25 g/mL and stirred or agitated for 1-6 hours, preferably 1.5-3 hours before being filtered, centrifuged, and/or decanted. This oil fly ash may then be added to another clean batch of water. Following the washing, the oil fly ash may be dried in an oven at 60-120° C., preferably 70-90° C., for 6-24 hours, preferably 10-18 hours. In other embodiments, the oil fly ash may be dried in an oven at a temperature below 60° C. or above 120° C., and/or for a time shorter than 6 hours or longer than 24 hours. However, in other embodiments, an oil fly ash that was washed with water may be mixed with the inorganic acid without drying.

The water used to wash the oil fly ash and other solid compounds, or to make solutions, may be tap water, distilled water, bidistilled water, deionized water, deionized distilled water, reverse osmosis water, and/or some other water. In one embodiment the water is bidistilled to eliminate trace metals. Preferably the water is bidistilled, deionized, deionized distilled, or reverse osmosis water, and at 25° C. has a conductivity of less than 10 $\mu S \cdot cm^{-1}$, preferably less than 1 $\mu S \cdot cm^{-1}$; a resistivity of greater than 0.1 $M\Omega \cdot cm$, preferably greater than 1 $M\Omega \cdot cm$, more preferably greater than 10 $M\Omega \cdot cm$; a total solid concentration of less than 5 mg/kg, preferably less than 1 mg/kg; and a total organic carbon concentration of less than 1000 µg/L, preferably less than 200 µg/L, more preferably less than 50 µg/L.

After the refluxing, the refluxed mixture is washed and dried to produce an acid-treated fly ash. In one embodiment, after the refluxing, the temperature of the refluxed mixture may be decreased to 50-70° C. or 55-65° C., and maintained at that temperature range for long enough for the majority of the acid to evaporate. The oil fly ash of the refluxed mixture may be washed with 20-50 mL water per 10 g oil fly ash, either once or repeatedly until the filtrate reaches a neutral pH, for instance, 6.5-7.0 or about 7.0. This pH neutralized oil fly ash may be dried in an oven at 90-130° C., preferably 95-120° C. for 12-90 hours, preferably 24-72 hours, though in some embodiments, may be dried in an oven at a temperature of lower than 90° C. or greater than 130° C., and/or for a time shorter than 12 hours or longer than 90 hours.

The acid-treated fly ash is mixed with a first aqueous solution of the positive polyelectrolyte to produce a fly ash with the first layer. The first aqueous solution may comprise the positive polyelectrolyte at a weight percentage of 0.015 wt %-2 wt %, preferably 0.02 wt %-0.1 wt %, or about 0.06 wt % relative to the total weight of the first aqueous solution. However, in some embodiments, the first aqueous solution may comprise less than 0.015 wt % or greater than 2 wt % of the positive polyelectrolyte. In one embodiment, the first aqueous solution consists of only the positive polyelectrolyte and water. In a preferred embodiment, the first aqueous solution comprises about 0.06 wt % poly(diallyldimethylammonium chloride). The acid-treated fly ash may be mixed with the first aqueous solution with stirring or agitating for 5-30 min, preferably 10-15 min, and may then be decanted or filtered. The resulting fly ash with the first layer may then be rinsed with water and/or a buffer.

The fly ash with the first layer is mixed with a second aqueous solution of the negative polyelectrolyte to produce the polyelectrolyte coated fly ash. The second aqueous solution may comprise the negative polyelectrolyte at a weight percentage of 0.015 wt %-2 wt %, preferably 0.02 wt %-0.1 wt %, or about 0.06 wt % relative to the total weight of the second aqueous solution. However, in some embodiments, the second aqueous solution may comprise less than 0.015 wt % or greater than 2 wt % of the negative polyelectrolyte. In one embodiment, the second aqueous solution consists of only the negative polyelectrolyte and water. In a preferred embodiment, the second aqueous solution comprises about 0.06 wt % polystyrene sulfonate. The fly ash with the first layer may be mixed with the second aqueous solution and/or rinsed using similar stirring or agitating as described previously for the first aqueous solution.

In one embodiment, the first aqueous solution and the second aqueous solution do not comprise an additional electrolyte, meaning that each aqueous solution only comprises water and a polyelectrolyte. However, in one embodiment, the first and/or second aqueous solution may further comprise a salt, such as NaCl, KCl, or a buffer, at a concentration of 0.1-1 M, preferably 0.2-0.6 M, more preferably 0.3-0.5 M. In a further embodiment, the presence of a salt may increase the thickness of a resulting polyelectrolyte layer, with a greater concentration of a salt leading to a greater thickness of a polyelectrolyte layer. For instance, the first or second aqueous solution comprising 0.4-0.6 M NaCl may lead to a corresponding polyelectrolyte layer having an average thickness of 7-8 nm. In another embodiment, the pH of the first and/or second aqueous solution may be modified in order to increase or decrease a polyelectrolyte layer thickness.

In one embodiment the first aqueous solution and/or the second aqueous solution may comprise a surfactant at a concentration of 1-500 mM, preferably 10-400 mM, more preferably 50-350 mM. In some embodiments, a positive polyelectrolyte or a negative polyelectrolyte may be considered a surfactant. The surfactant may be an ionic surfactant, a nonionic surfactant, a biological surfactant, or some other type of surfactant, and may be used to adjust the density and/or stability of a polyelectrolyte layer on the polyelectrolyte coated fly ash.

Exemplary ionic surfactants include, but are not limited to, (1) anionic (based on sulfate, sulfonate or carboxylate anions), for example, perfluorooctanoate (PFOA or PFO), perfluorooctanesulfonate (PFOS), sodium dodecyl sulfate (SDS), ammonium lauryl sulfate, and other alkyl sulfate salts, sodium laureth sulfate (also known as sodium lauryl ether sulfate (SLES)), alkyl benzene sulfonate, soaps, and fatty acid salts; (2) cationic (based on quaternary ammonium cations), for example, cetyl trimethylammonium bromide (CTAB) (also known as hexadecyl trimethyl ammonium bromide), and other alkyltrimethylammonium salts, cetylpyridinium chloride (CPC), polyethoxylated tallow amine (POEA), benzalkonium chloride (BAC), and benzethonium chloride (BZT); and (3) zwitterionic (amphoteric), for example, dodecyl betaine, cocamidopropyl betaine, and coco ampho glycinate.

Exemplary nonionic surfactants include, but are not limited to, alkyl poly(ethylene oxide), alkylphenol poly(ethylene oxide), copolymers of poly(ethylene oxide) and poly(propylene oxide) (commercially known as Poloxamers or Poloxamines), polyoxyethylene octyl phenyl ether (TRITON X-100®), alkyl polyglucosides, for example, octyl glucoside and decyl maltoside, fatty alcohols, for example, cetyl alcohol and oleyl alcohol, cocamide MEA, cocamide DEA, and polysorbates (commercially known as TWEEN 20, TWEEN 80), for example, dodecyl dimethylamine oxide.

Exemplary biological surfactants include, but are not limited to, micellar-forming surfactants or surfactants that form micelles in solution, for example, DNA, vesicles, phospholipids, and combinations thereof. In other embodiments, other additives may be used to direct the growth of the nanoparticles, such as polyethylene glycol or sodium citrate. In one embodiment, the electrolyte solution comprises polyethylene glycol at a weight percentage of 1-8 wt %, preferably 2-7 wt %, more preferably 3-6 wt % relative to a total weight of the electrolyte solution. However, in some embodiments, the electrolyte solution may comprise polyethylene glycol at a weight percentage less than 1 wt % or greater than 8 wt % relative to a total weight of the electrolyte solution. The polyethylene glycol may have a weight average molecular weight of 0.2-500 kDa, preferably 1-300 kDa, more preferably 2-100 kDa.

In another embodiment, the first aqueous solution may comprise more than one positive polyelectrolyte and/or the second aqueous solution may comprise more than one negative polyelectrolyte. For instance, the first aqueous solution may comprise both PDADMAC and PEI at a PDADMAC to PEI mass ratio of 1:10-10:1, preferably 1:5-5:1, more preferably 1:2-2:1.

In one embodiment, the polyelectrolyte coated fly ash may be placed in the first aqueous solution as before, in order to add another polyelectrolyte layer. The process of polyelectrolyte coating may be repeated to produce a fly ash coated with alternating layers of positive and negative polyelectrolyte, as discussed previously in the first aspect of the disclosure. Similarly, a polyelectrolyte coated fly ash having two or more positive polyelectrolyte layers may comprise the same positive polyelectrolyte, or may comprise different positive polyelectrolytes; a polyelectrolyte coated fly ash having two or more negative polyelectrolyte layers may comprise the same negative polyelectrolyte, or may comprise different negative polyelectrolytes.

In an alternative embodiment, fumed silica, clay, a cenosphere, asphaltene, layered double hydroxides, ceramics, or other materials may be used in place of the fly ash, in order to produce polyelectrolyte coated particles based on different materials.

According to a third aspect, the present disclosure relates to a method of reducing a contaminant concentration from an aqueous solution with the polyelectrolyte coated fly ash of the first aspect. This method involves mixing the polyelectrolyte coated fly ash with the aqueous solution comprising the contaminant. The polyelectrolyte coated fly ash reduces the contaminant concentration in the aqueous solution by adsorption.

The aqueous solution may be a solution from an ocean, a bay, a river, a lake, a swamp, a pond, a pool, a rain sample, a fountain, a bath, an aquarium, a water treatment plant, a sewage treatment plant, a desalination plant, a manufacturing plant, a chemical plant, a textile plant, a power plant, a gas station, a food processing plant, a restaurant, a dry cleaner, or some other place that may be a source of contaminated water mixtures. In another embodiment, the aqueous solution may be prepared in a laboratory or pilot plant for the purpose of testing contaminant removal. In some embodiments, the aqueous solution may be a brine, or comprise sea water or salt water.

In one embodiment, the aqueous solution may comprise a non-polar liquid phase at a volume percent concentration of 0.5-50%, preferably 2-40%, more preferably 4-30% relative to a total volume of the aqueous solution. The non-polar liquid phase may be emulsified or dispersed throughout the aqueous solution, may float at the top of the aqueous solution, or some combination of both. In another embodiment, the aqueous solution may not contain a non-polar liquid phase.

The contaminant may be present in the aqueous solution at a concentration of 0.5 mg/L-50 mg/L, preferably 0.8 mg/L-40 mg/L, more preferably 1.0 mg/L-30 mg/L, even more preferably 1.5 mg/L-10 mg/L, or about 2 mg/L.

However, in some embodiments, the contaminant may be present in the aqueous solution at a concentration of less than 0.5 mg/L or greater than 50 mg/L.

In one embodiment, the contaminant is at least one metal selected from the group consisting of Cd, Pb, Cr, Se, Hg, As, Mn, Ni, Cu, Zn, Ag, Tl, and Sb. In a further embodiment, the contaminant may be Cd, Pb, Cr, As, Hg, and/or Se. Preferably where the contaminant is a metal, the contaminant has an oxidation state of +2. However, in other embodiments, the metal may have an oxidation state of 0, +1, +3, or +4. In a preferred embodiment, the metal is Cd, or $Cd^{2+}$. In the aqueous solution, $Cd^{2+}$ may be present in the form of $Cd(OH)_2$, $Cd(OH)^+$, and/or $[Cd(H_2O)_6]^{2+}$.

In one embodiment, the contaminant is a dye. The dye may be an azin dye, an azo dye, a diarylmethane dye, a fluorescent dye, a food coloring, a fuel dye, an ikat dye, an indigo structured dye, an indophenol dye, a perylene dye, a phenol dye, a quinoline dye, a rhodamine dye, a solvent dye, a staining dye, a thiazine dye, a thiazole dye, a triarylmethane dye, a vat dye, a violanthrone dye, or some other type of dye. In another embodiment, the contaminant may be some other organic compound, such as a pharmaceutical compound, a metabolite, a microbial toxin, an herbicide, a pesticide, or a steroid.

In one embodiment, the aqueous solution may comprise more than one contaminant, and the polyelectrolyte coated fly ash may adsorb more than one contaminant. For instance, the aqueous solution may comprise a first contaminant and a second contaminant having a first to second contaminant mass ratio of 1:50-50:1, preferably 1:10-10:1, more preferably 1:5-5:1. Where the aqueous solution comprises more than one contaminant, the polyelectrolyte coated fly ash may adsorb the more than one contaminant with different or substantially similar adsorption capacities.

In one embodiment, the polyelectrolyte coated fly ash may be contacted with the aqueous solution by dispersing or mixing the polyelectrolyte coated fly ash in a fixed volume of aqueous solution, and then stirring or agitating the aqueous solution to keep the polyelectrolyte coated fly ash evenly mixed throughout. In one embodiment, the polyelectrolyte coated fly ash is dispersed, stirred, or mixed within the aqueous solution at a concentration of 1-10 g/L, preferably 1.5-8 g/L, more preferably 2-7 g/L, even more preferably 3-6 g/L, or about 4 g/L. However, in some embodiments, the polyelectrolyte coated fly ash may be dispersed within the aqueous solution at a concentration of less than 1 g/L or greater than 10 g/L. In one embodiment, for the mixing, the polyelectrolyte coated fly ash may be stirred in the aqueous solution at a rate of 130-200 rpm, preferably 140-160 rpm, or about 150 rpm. The stirring may be done with an impeller, a wand, a magnetic stir bar, or by placing a vessel of the aqueous solution on a moving platform.

In one embodiment, the polyelectrolyte coated fly ash may not be dispersed or mixed in the aqueous solution but fixed to a solid support, such as a plate or a wire mesh. In one embodiment, the solid support may be planar. The solid support may also be a single piece so that the polyelectrolyte coated fly ash may be easily removed from the aqueous solution, or removed from a vessel. In a further embodiment, where the polyelectrolyte coated fly ash is attached to a solid support so that it does not disperse, the aqueous solution may be continually flowed over the polyelectrolyte coated fly ash. In another related embodiment, the aqueous solution may be intermittently flowed over the polyelectrolyte coated fly ash. Alternatively, the polyelectrolyte coated fly ash may be dispersed but confined within a volume of wire mesh. In another embodiment, the polyelectrolyte coated fly ash may be fixed to a solid support, but dispersed or mixed in the aqueous solution. For example, the polyelectrolyte coated fly ash may be attached to magnetic microparticles having diameters of 10-400 μm, preferably 40-200 μm.

In one embodiment, at least 90 wt %, preferably at least 92 wt %, more preferably at least 95 wt % of the contaminant, relative to an initial total weight of the contaminant, is adsorbed by the polyelectrolyte coated fly ash in at least 20 minutes. In other embodiments, at least 70 wt %, preferably at least 75 wt %, more preferably at least 80 wt % of the contaminant, relative to the initial total weight of the contaminant, is adsorbed in 4-20 minutes, preferably 5-15 minutes, more preferably 6-10 minutes.

In one embodiment, at least 95 wt %, preferably at least 97 wt %, more preferably at least 99 wt % of the contaminant, relative to the initial total weight of the contaminant, is adsorbed by the polyelectrolyte coated fly ash in at least 120 minutes. In other embodiments, at least 95 wt %, preferably at least 97 wt %, more preferably at least 99 wt % of the contaminant, relative to the initial total weight of the contaminant, is adsorbed in 60-400 minutes, preferably 100-220 minutes, more preferably 120-200 minutes.

In one embodiment, the aqueous solution has a pH of 8-10, preferably 8.5-9.5, or about 9.0. The pH may be adjusted using the addition of buffer, such as acetate buffer, or acids, such as HCl, by a person having ordinary skill in the art. In some embodiments, however, the aqueous solution may have a pH of lower than 8 or greater than 10. In one embodiment, the polyelectrolyte coated fly ash may adsorb more of a certain contaminant at a specific pH range.

In one embodiment, the aqueous solution has a temperature of 18-55° C., preferably 20-50° C., more preferably 22-45° C. In one embodiment, the contaminant adsorption may be sufficiently influenced by the aqueous solution temperature.

In one embodiment, the polyelectrolyte coated fly ash has an adsorption capacity of 0.5-200 mg, preferably 2-100 mg, more preferably 5-10 mg of the contaminant per g of the polyelectrolyte coated fly ash. For example, in one embodiment, 3-5 g of the polyelectrolyte coated fly ash may remove 4-6 mg contaminant after mixing in an aqueous solution for about 15 minutes, and this 4-6 mg contaminant that was removed may be considered to be adsorbed onto the polyelectrolyte coated fly ash. However, in some embodiments, the polyelectrolyte coated fly ash may have an adsorption capacity of less than 0.5 mg per g, or greater than 200 mg per g. In one embodiment, the adsorption capacity may depend on the identity of the contaminant. For example, and without limitation, Cd may have a higher adsorption capacity than Pb.

In one embodiment, the polyelectrolyte coated fly ash adsorbs an amount of contaminant that is greater by a factor of 1.2-3.5, preferably 1.3-3.0, more preferably 1.4-2.5 than a contaminant adsorbed by an essentially similar acid-treated fly ash not having a polyelectrolyte layer. For example, in one embodiment, a polyelectrolyte coated fly ash may adsorb 99 wt % of a contaminant, relative to a total mass of the contaminant, while an acid-treated fly ash not having a polyelectrolyte layer, in the same conditions, would adsorb 40-77 wt %, preferably 55-70 wt % of the contaminant. However, in some embodiments, the polyelectrolyte coated fly ash may adsorb an amount of contaminant that is more than 3.5, or more than 4 times greater than a contaminant adsorbed by an essentially similar acid-treated fly ash not having a polyelectrolyte layer.

In one embodiment, the adsorption of the contaminant by the polyelectrolyte coated fly ash fits well with at least one of Langmuir, Freundlich, and Temkin isotherm models, thereby inferring that the adsorption may occur as a monolayer and as a heterogeneous surface adsorption. Without being bound to any particular hypothesis, the adsorption of the contaminant may involve forces of ion sharing, electron exchange, or other electrostatic interaction between the contaminant and the polyelectrolyte layer of the PEFA.

In one embodiment, the method further comprises removing the polyelectrolyte coated fly ash from the aqueous solution to produce a recovered polyelectrolyte coated fly ash. The recovered polyelectrolyte coated fly ash is mixed with an acidic solution. The acidic solution is dried to produce a cleaned polyelectrolyte coated fly ash. The cleaned polyelectrolyte coated fly ash is reused and maintains an adsorption capacity for at least 5 purification cycles.

Preferably in removing the polyelectrolyte coated fly ash, all of it may be recovered after each purification cycle, enabling multiple cycles to be repeated with a single batch of polyelectrolyte coated fly ash. However, in some embodiments, 0.1-1 mass %, or 1-5 mass %, may be lost with each cycle. Preferably the reuse of the polyelectrolyte coated fly ash does not significantly change its morphology or other physical characteristics. The polyelectrolyte coated fly ash may be removed from the aqueous solution by any means similar to those mentioned for removing the acid-treated fly ash from solution. In addition, where the recovered polyelectrolyte coated fly ash is attached to a magnetic support, a magnet may be used In one embodiment, the recovered polyelectrolyte coated fly ash may be mixed with the acidic solution at a concentration of 1-30 g/L, preferably 5-25 g/L, more preferably 10-20 g/L, though in some embodiments, the concentration may be less than 1 g/L or greater than 30 g/L. The mixing may involve techniques of agitating or dispersing, as previously mentioned, and in some embodiments, the acidic solution may be cooled or heated. Alternatively, the recovered polyelectrolyte coated fly ash and acidic solution may first be mixed, and then left to sit without agitation.

In one embodiment, the acidic solution comprises one or more inorganic acids at a total concentration of 0.05-0.5 M, preferably 0.08-0.3 M, more preferably 0.09-0.11 M, or about 0.10 M. However, in some embodiments, the acidic solution may comprise the inorganic acids at a total concentration of less than 0.05 M or greater than 0.5 M. The inorganic acid may be nitric acid, sulfuric acid, hydrochloric acid, hydrobromic acid, phosphoric acid, perchloric acid, or some other acid. Where two inorganic acids are used, the inorganic acids may be present in the acidic solution at a mol ratio of 1:10-10:1, preferably 1:5-5:1, more preferably 1:2-2:1. Preferably the inorganic acid is nitric acid. In an alternative embodiment, an organic acid may be used, such as acetic acid, and in another alternative embodiment, the recovered polyelectrolyte coated fly ash may be mixed with a basic solution, such as sodium hydroxide.

In one embodiment, mixing the recovered polyelectrolyte coated fly ash with the acidic solution enables desorption of the contaminant from the recovered polyelectrolyte coated fly ash into the acidic solution. In one embodiment, 20-50 wt %, preferably 25-45 wt %, more preferably 27-40 wt % of the adsorbed contaminant, relative to the initial weight of the adsorbed contaminant, releases from the recovered polyelectrolyte coated fly ash and becomes free in the acidic solution after 10-40 minutes, more preferably after 15-35 minutes of mixing. In another embodiment, 60-100 wt %, preferably 65-95 wt %, more preferably 70-90 wt % of the adsorbed contaminant, relative to the initial weight of the adsorbed contaminant, releases from the recovered polyelectrolyte coated fly ash and becomes free in the acidic solution after 60-180 minutes, more preferably after 70-120 minutes of mixing. In some embodiments, depending on the type of contaminant, the acidic solution may react with the adsorbed contaminant. In one embodiment, the recovered polyelectrolyte coated fly ash is in contact with the acidic solution for 30-60 min, 1-2 h, 2-6 h, or 12-24 h. In another embodiment, the recovered polyelectrolyte coated fly ash may be stored indefinitely in the acidic solution until needed for reuse.

The recovered polyelectrolyte coated fly ash is removed from the acidic solution to produce a cleaned polyelectrolyte coated fly ash. Preferably the recovered polyelectrolyte coated fly ash is removed from the acidic solution in any means similar to those previously mentioned for removing oil fly ash or acid-treated fly ash from solutions. In addition, where the polyelectrolyte coated fly ash is attached to a magnetic support, a magnet may be used. In another embodiment, a base may be added to the acidic solution to neutralize the solution before removing the polyelectrolyte coated fly ash. Preferably the cleaned polyelectrolyte coated fly ash is rinsed or washed in a manner similar to that described previously.

In an alternative embodiment, the polyelectrolyte coated fly ash may be fixed to a support and exposed to a flowing contaminant solution, where the polyelectrolyte coated fly ash then adsorbs a contaminant. The used polyelectrolyte coated fly ash may then be cleaned in place and optionally dried while staying fixed to the support. Alternatively, the nanostructured material may not be fixed to a support, but confined within a permeable membrane or filter, allowing similar operation.

In one embodiment, the cleaning of a recovered polyelectrolyte coated fly ash may involve electromagnetic radiation, for instance, subjecting the recovered polyelectrolyte coated fly ash to UV light. This UV light irradiation may help in degrading organic compounds or microorganisms adhered to the polyelectrolyte coated fly ash.

Following the drying, the cleaned polyelectrolyte coated fly ash may be reused to adsorb the same or a different contaminant from an aqueous solution, as described in the third aspect of the disclosure. In one embodiment, the cleaned polyelectrolyte coated fly ash maintains its adsorption capacity for at least 5 purification cycles. Here, "maintains adsorption capacity" means that the ratio of the maximum adsorbed contaminant mass per mass of cleaned polyelectrolyte coated fly ash is at least 70%, preferably at least 80%, more preferably at least 90% of its initial value. A purification cycle refers to the adsorption of a contaminant by the cleaned polyelectrolyte coated fly ash and the subsequent cleaning of the polyelectrolyte coated fly ash to remove a portion or all of the contaminant. Preferably the cleaned polyelectrolyte coated fly ash is able to maintain its adsorption capacity across different contaminants. In other embodiments, the cleaned polyelectrolyte coated fly ash is able to maintain its adsorption capacity for at least 10 cycles, at least 20 cycles, at least 30 cycles, or even at least 50 cycles. In one embodiment, a recovered polyelectrolyte coated fly ash is able to maintain its adsorption capacity without cleaning, for instance, if the recovered polyelectrolyte coated fly ash had been previously mixed with low concentrations of a contaminant.

The examples below are intended to further illustrate protocols for preparing and using the polyelectrolyte coated fly ash, and are not intended to limit the scope of the claims. See F. A. Olabemiwo, B. S. Tawabini, F. Patel, T. A. Oyehan, M. Khaled, and T. Laoui, "Cadmium Removal from Contaminated Water Using Polyelectrolyte-Coated Industrial Waste Fly Ash," *Bioinorganic Chemistry and Applications*, 2017, Article ID 7298351, doi:10.1155/2017/7298351—incorporated herein by reference in its entirety.

Example 1

Polyelectrolytes

The efficiency of the FA for removing water pollutants may be improved by coating the FA surface with polyelectrolytes, which enhance the adsorptive capacity of several adsorbent materials. As fly ash is cheaper compared to other adsorbent materials, any improvement in the efficiency of polyelectrolyte-coated fly ash in the removal of heavy metal ions from water gives it an advantage over other adsorbent materials.

Polyelectrolytes are charged organic polymers that are also soluble in water. These polymers may be cationic or anionic depending on the functional ionic group. They are used in many applications such as water purification and paper production. See B. Bolto and J. Gregory, "Organic polyelectrolytes in water treatment," *Water Research*, vol. 41, no. 11, pp. 2301-2324, 2007, incorporated herein by reference in its entirety. Examples of polyelectrolytes include poly(diallyldimethylammonium chloride) (PDADMAC), polystyrene sulfonate (PSS), and polyethylenimine (PEI).

Example 2

Materials and Methods
Chemicals/Stock Solutions

All chemicals and solvents used were of analytical grade. PDADMAC (Mw: 200,000-350,000 g/mol.) and PSS (Mw: 70,000 g/mol.) were commercially acquired and used. Deionized (DI) water was generated in real time from a MILLI-Q ULTRAPURE water system (Millipore). Working standard solutions were prepared from stock Cadmium ICP Standard Solution supplied by ULTRA Scientific (USA) by serial progressive dilutions with deionized water. The prepared solutions were stirred for 30 min with a magnetic stirrer to ensure homogeneity. The pH of the solutions was adjusted using either 0.1 M $HNO_3$ or 0.1 M NaOH solution. Buffer solutions were added as required to maintain a constant pH during the experiment.

Adsorbent Preparation

The fly ash used in this study was obtained from a power plant in the Eastern Province of Saudi Arabia. In this plant, raw fly ash is generated from the combustion of heavy liquid fuel and collected by an electrostatic precipitation technique. This raw fly ash (RFA) was processed further to produce acid-treated fly ash (AFA) and polyelectrolyte-coated fly ash (PEFA).

Acid Treatment of Fly Ash 150 g of fly ash material was soaked in 1000 mL DI water and stirred for 2 h. After stirring, the mixture was allowed to settle for 10 min before the water was decanted and the procedure was repeated 3 times to produce a slurry phase, which was subsequently dried in the oven at 80° C. for 12 h and stored until the batch treatment experiments. 100 g of washed fly ash was soaked in 300 mL of 1 M $HNO_3$. The mixture was refluxed at 110° C. temperature for 24 h. The acid was allowed to evaporate at 60° C., after which the reaction mixture was diluted with 500 mL DI water until the pH of the filtrate became neutral. The residue was then dried in the oven at 105° C. for 72 h. See I. Y. El-Sherif and N. A. Fathy, "Modification of adsorptive properties of bagasse fly ash for uptaking cadmium from aqueous solution," *Environmental Research, Engineering and Management*, vol. 2, no. 2, pp. 19-28, 2013; H. A. Asmaly, Ihsanullah, B. Abussaud et al., "Adsorption of phenol on aluminum oxide impregnated fly ash," *Desalination and Water Treatment*, vol. 57, no. 15, pp. 6801-6808, 2016; M. Anwar Parvez, H. I. Al-Abdul Wahhab, R. A. Shawabkeh, and I. A. Hussein, "Asphalt modification using acid treated waste oil fly ash," *Construction and Building Materials*, vol. 70, pp. 201-209, 2014; R. Shawabkeh, M. J. Khan, A. A. Al-Juhani, H. I. Al-Abdul Wahhab, and I. A. Hussein, "Enhancement of surface properties of oil fly ash by chemical treatment," *Applied Surface Science*, vol. 258, no. 5, pp. 1643-1650, 2011; R. Shawabkeh, O. Khashman, and S. Tarawneh, "Synthesis of activated carbon from spent lubricating oil and application for adsorption of cadmium and lead ions from aqueous solution," *Combined and Hybrid Adsorbents*, J. M. Loure, pp. 195-200, 2006; and F. A. Abuilaiwi, T. Laoui, M. Al-Harthi, and M. A. Atieh, "Modification and functionalization of multiwalled carbon nanotube (MWCNT) via fischer esterification," *The Arabian Journal for Science and Engineering*, vol. 35, no. 1, pp. 37-48, 2010, each incorporated herein by reference in their entirety.

Layer-by-Layer Deposition (Polyelectrolyte Coating of Fly Ash)

Figure 2:
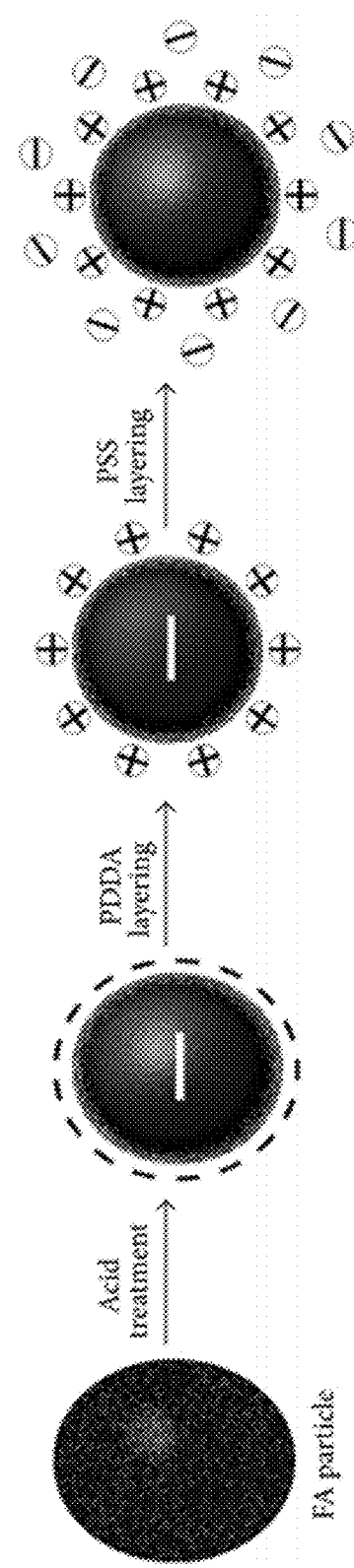
FIG. 2 is a schematic illustration of acid treatment and polyelectrolyte coating of fly ash.

Polyelectrolyte coating of fly ash (PEFA) was prepared by coating the acid-treated fly ash (AFA) with polyelectrolyte (PE) using modified procedure of layer-by-layer method described by Li et al. See Q. Li, B. Wang, C. Li, J. Pang, and J. Zhai, "Synthesis of fly ash cenospheres coated with polypyrrole using a layer-by-layer method," *Journal of Physics D: Applied Physics*, vol. 44, no. 44, Article ID 445301, 2011, incorporated herein by reference in its entirety. Succinctly, the solutions used were prepared by dissolving 3 mL of poly(diallyldimethylammonium chloride) (PDADMAC) or polystyrene sulfonate (PSS) in 1000 mL of water; the solutions were stirred with a stirrer to ensure a homogenous mixture. The layering then followed Li et al.'s procedure but without the addition of NaCl to ensure the formation of thinly coated PE layers as illustrated in FIG. 2. See Q. Li et al., incorporated herein by reference in its entirety. The procedure was repeated until the desired number of layers was attained, that is (PDADMAC/PSS-FA)$_n$, where n could be 1, 2, 3, 4, 5, . . . , 20.

Example 3

Characterization
Characterization of FA Adsorbents

Characterization of adsorbents' (RFA, AFA, and PEFA) surface morphology was conducted to understand the elemental, mineralogical, and functional group compositions. Scanning electron microscopy (SEM) micrographs were documented using FESEM (JSM-5900LV) fitted with an energy disperse X-ray spectroscopy (EDX) detector model X-MAX. Functional groups were determined using a Perkin-Elmer 16 FPC FTIR spectrometer with the aid of KBr pellets, and spectra were generated in the region of 600-4000 $cm^{-1}$ wavenumbers. Thermogravimetric analysis (TGA) was carried out using thermal analyzer (STA 449 F3 JUPITER) by Netzsch, Germany. The analysis was conducted in air at a distinct temperature ramped at 10° C. per min to 900° C. See F. A. Al-Khaldi et al., incorporated herein by reference in its entirety. Phase analysis of the adsorbents was evaluated using a D8 ADVANCE X-ray Diffractometer manufactured by BRUKER (Germany).

Batch Adsorption Studies

Batch mode adsorption studies were conducted at room temperature in 100 mL Erlenmeyer flasks covered with aluminum foil to avoid contamination. Effects of pH, contact time, adsorbent dosage, mixing rate, initial concentration, and temperature were investigated. Analysis of initial and final concentration of Cd ions was conducted using OPTIMA 8000® ICP-OES Spectrometer (Perkin-Elmer, USA). The percent removal, as well as adsorption capacity of metal ions, was calculated with the following equations:

$$\% \text{ removal} = \frac{C_i - C_e}{C_i} \times 100 \quad (1)$$

$$\text{adsorption capacity, } q_e (\text{mg/g}) = \frac{C_i - C_e}{M_s} \times V, $$

where $C_i$ is the metal ion initial concentration in solution (mg/L), $C_e$ is the final concentration of adsorbate ion in solution (mg/L), V is the total volume of solution (L), and $M_s$ is adsorbent dosage. The mean values of 5 replicates were used for data analysis to ensure reproducibility; relative standard deviation (RSD) was in the range of ±3-5%. The precision of the standard solution for analysis was better than 3%.

Adsorption Isotherm Model

The descriptions of adsorption behaviors are usually provided by mathematical models known as the adsorption isotherm models. See F. A. Al-Khaldi et al., incorporated herein by reference in its entirety. The distribution of adsorbate molecules between the liquid phase and a solid phase at equilibrium state can be indicated by the adsorption isotherm. See H. A. Asmaly et al., incorporated herein by reference in its entirety. In this study, Langmuir and Freundlich isotherm models were employed to assess the adsorption behavior of polyelectrolyte-coated fly ash (PEFA) for Cd ion removal in an aqueous medium. Langmuir isotherm model explains the monolayer adsorption, suggesting that adsorbent materials have a finite capacity, considered as the equilibrium state beyond which no further adsorption takes place. See I. Langmuir, "The adsorption of gases on plane surfaces of glass, mica and platinum," *The Journal of the American Chemical Society*, vol. 40, no. 9, pp. 1361-1403, 1918, incorporated herein by reference in its entirety. The existence of specific homogeneous sites within the adsorbent at which adsorption occurs is the main assumption of this model. The Freundlich isotherm model also explains the adsorptive behavior of the adsorbent material. Adsorption on a heterogeneous surface with the interaction between adsorbate molecules is the main application of this model. The Langmuir and Freundlich isotherms are expressed by the following equation:

$$Q_e = \frac{Q_{max} K_L C_e}{1 + K_L C_e}. \quad (2)$$

The above equation can be linearized to $$\frac{1}{Q_e} = \frac{1}{Q_{max} K_L C_e} + \frac{1}{Q_{max}}. \quad (3)$$

From (2), $C_e$ is the equilibrium of Cd concentration (mg/L); $Q_e$ is the amount of Cd (mg) adsorbed per gram of the adsorbent at equilibrium (mg/g); $Q_{max}$ is the theoretical maximum adsorption capacity (mg/g); and $K_L$ is the Langmuir isotherm constant (L/mg). A linear plot of $1/Q_e$ versus $1/C_e$ can be used to obtain the values of $Q_{max}$ and $K_L$ from slope and intercept, respectively.

$$Q_e = K_f C_e^{1/n} \quad (4)$$

The above equation can be linearized to $$\ln Q_e = \ln K_f + \frac{1}{n} \ln C_e. \quad (5)$$

From the equation above, $K_f$ is the Freundlich adsorption constant related to the adsorption capacity [(mg/g) (L/mg)], while the remaining parameters ($Q_e$ and $C_e$) were described above. A linear plot of $\ln Q_e$ versus $\ln C_e$ can be used to obtain the values of $K_f$ and n from intercept and slope, respectively.

Kinetic Modelling Studies

The adsorption of Cd(II) was analyzed using different kinetic models like pseudo-first-order model, pseudo-second-order model, and Weber intraparticle diffusion expressed in the following equations:

$$\log \frac{(q_e - q_t)}{q_e} = \frac{-K_L t}{2.303} \quad (6)$$

$$\frac{1}{(q_e - q_t)} = \frac{1}{q_e + Kt} \quad (7)$$

$$\frac{t}{q_t} = \frac{1}{(2K_s q_e^2)} + \frac{t}{q_e} \quad (8)$$

$$q_t = K_{id} t^{1/2} + C. \quad (9)$$

In the equations above, $q_e$ and $q_t$ are amounts of Cd adsorbed (mg/g) at equilibrium and at a given time, t (min), respectively. $K_L$ is the pseudo-first-order rate constant sorption (min$^{-1}$). $K_s$ and K are pseudo-second-order and second order adsorption rate constants (g·mg$^{-1}$·min$^{-1}$). $K_{id}$, $t^{1/2}$, and C are intraparticle diffusion rate constant (mg/g·min-1), square root of time (min)$^{1/2}$, and intercept, respectively. The constants ($K_L$, $K_S$, and K) can be determined from the slopes of linear plots of $\log(q_e - q_t)$ against t, $t/q_t$ against t, and $1/(q_e - q_t)$ against t, where $q_e$ can be determined from the intercept data of pseudo-second-order and second-order rate equations.

Example 4

Results and Discussions

Surface Morphology

Surface morphology of raw fly ash (RFA), acid-treated FA (AFA), and polyelectrolyte-coated FA (PEFA) was examined with the aid of Field-Emission Scanning Electron Microscopy (FESEM) and energy disperse X-ray spectrometry (EDX). The surface morphologies of the RFA, AFA, and PEFA are presented in FIGS. 3A and 3B; 4A and 4B; and 5A and 5B, respectively.

Figure 3B:
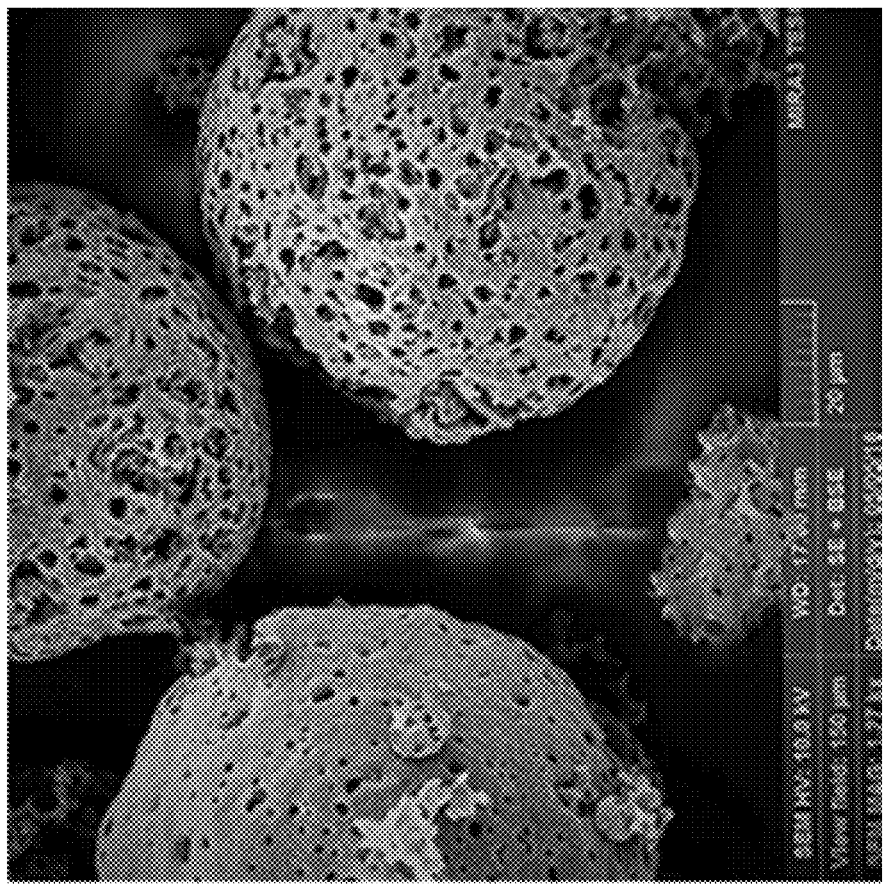
FIG. 3B is another SEM micrograph of RFA.
Figure 3A:
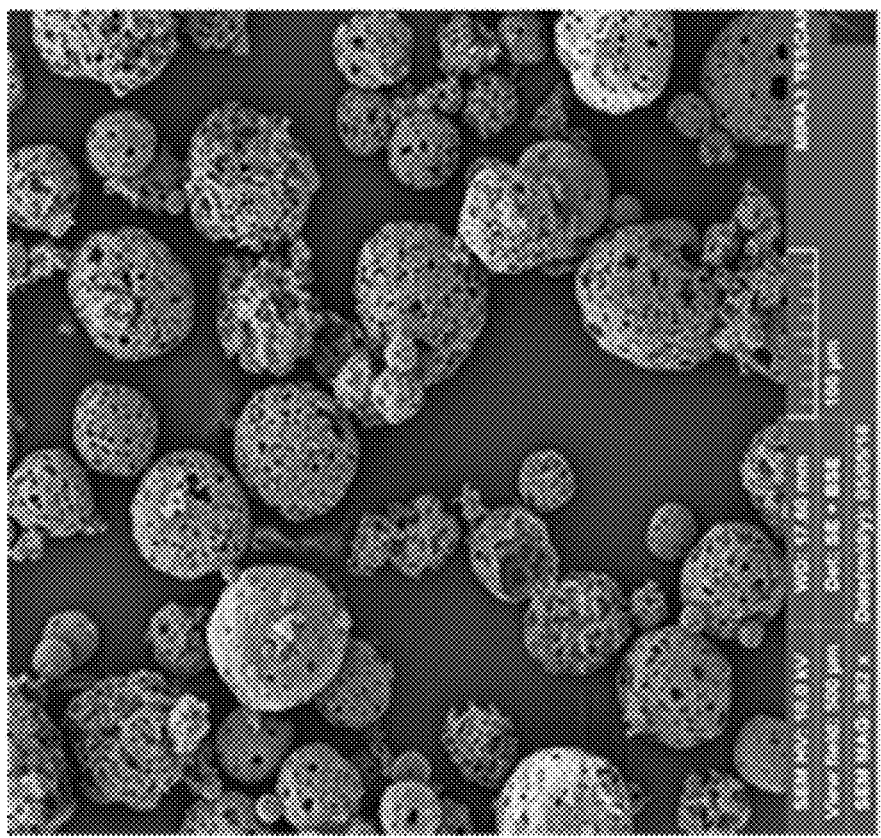
FIG. 3A is an SEM micrograph of raw oil fly ash (RFA).
Figure 3C:
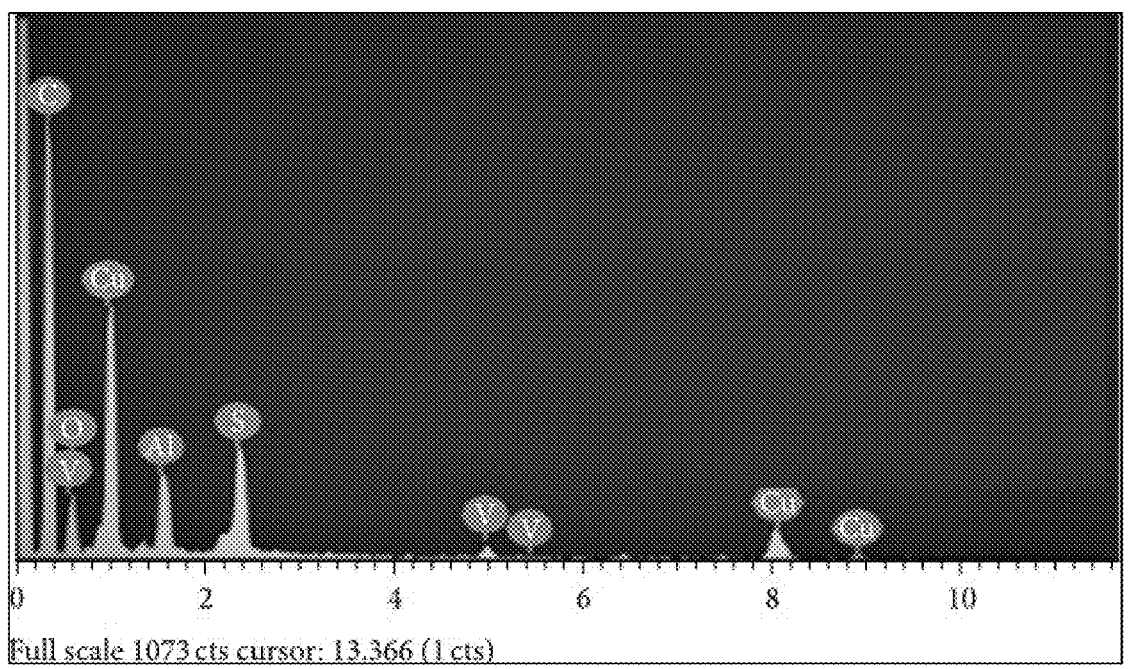
FIG. 3C is an EDX spectrum of RFA.
Figure 3D:
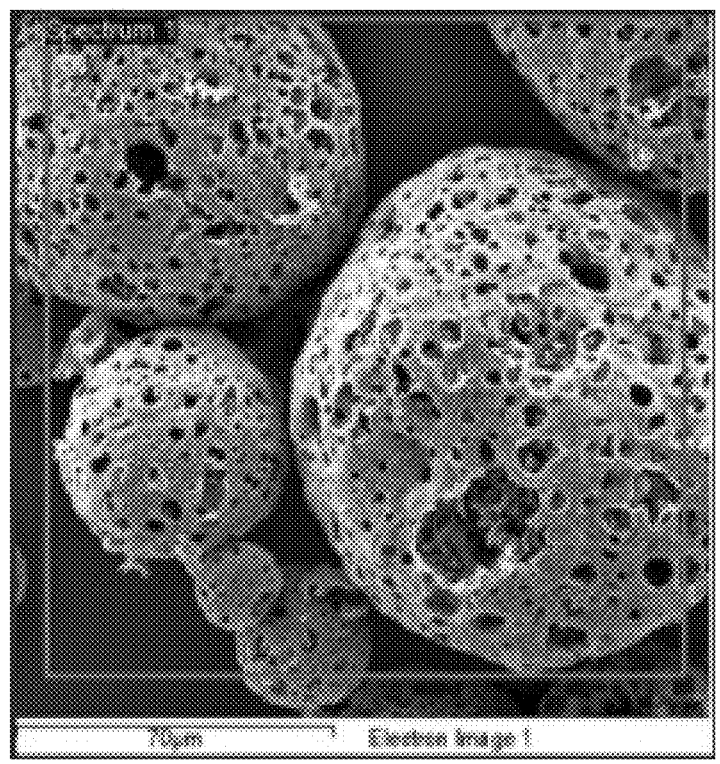
FIG. 3D is the region from which the EDX spectrum of FIG. 3C was sampled.

FIGS. 3A and 3B show that the RFA has sizes that range from 50 to 500 microns. Elemental composition revealed by EDX spectra in FIG. 3C shows that carbon (C) has 72%, oxygen has 16.6%, and the remaining elements, silicon (Si), copper (Cu), vanadium (V), aluminum (Al), and sulphur (S), were found to have 0.2, 6.0, 0.7, 2.0, and 2.8% composition, respectively.

Figure 4B:
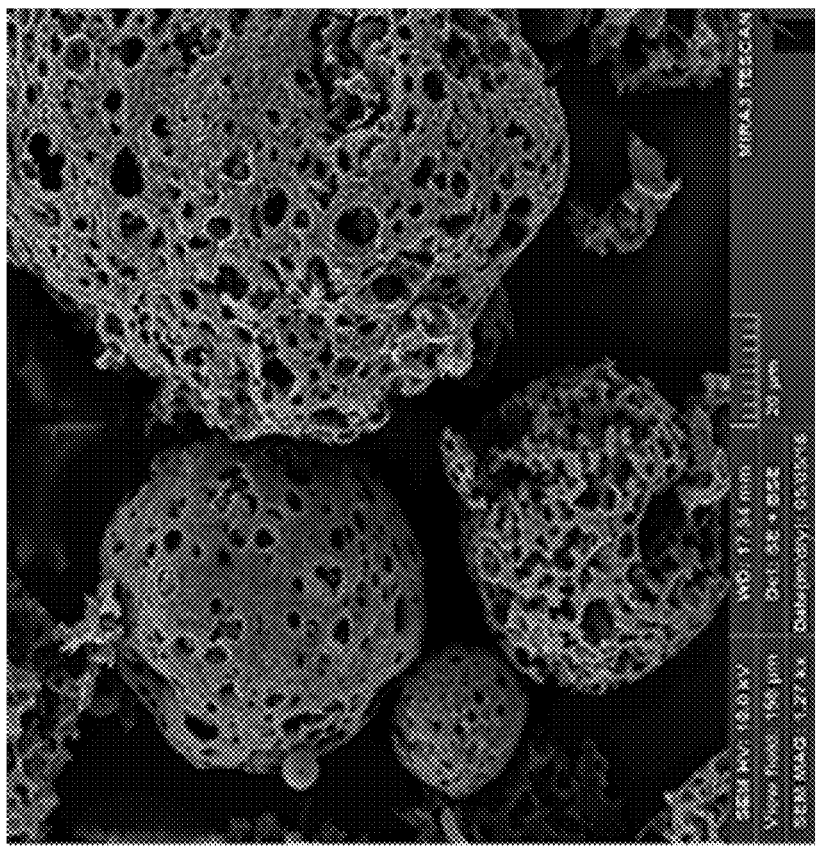
FIG. 4B is another SEM micrograph of AFA.
Figure 4A:
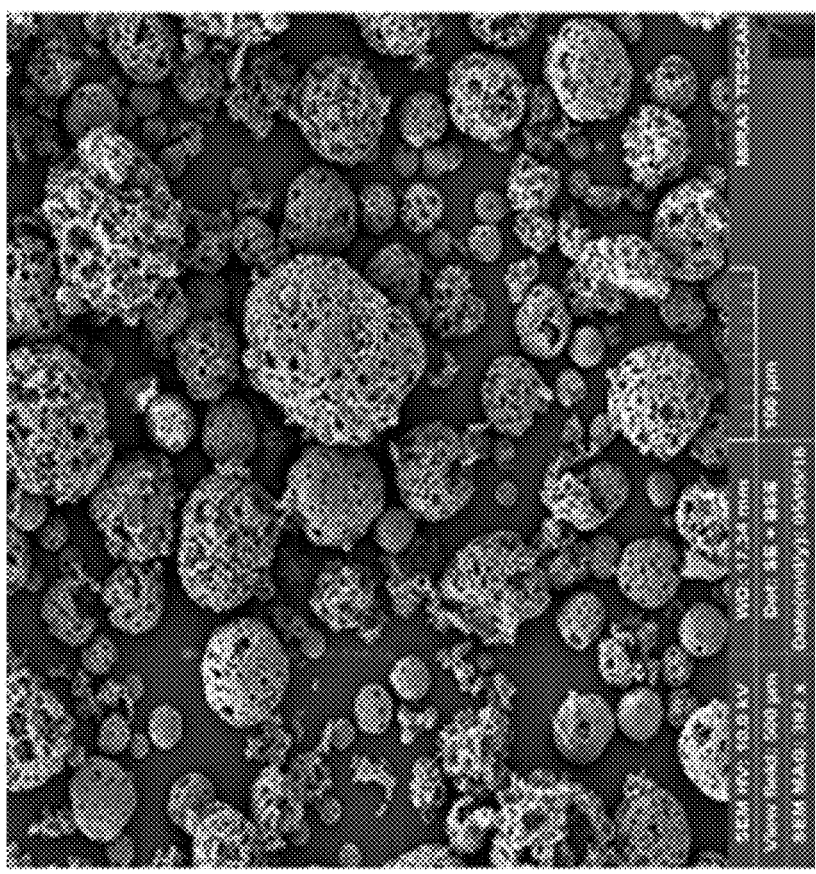
FIG. 4A is an SEM micrograph of acid-treated fly ash (AFA).
Figure 4C:
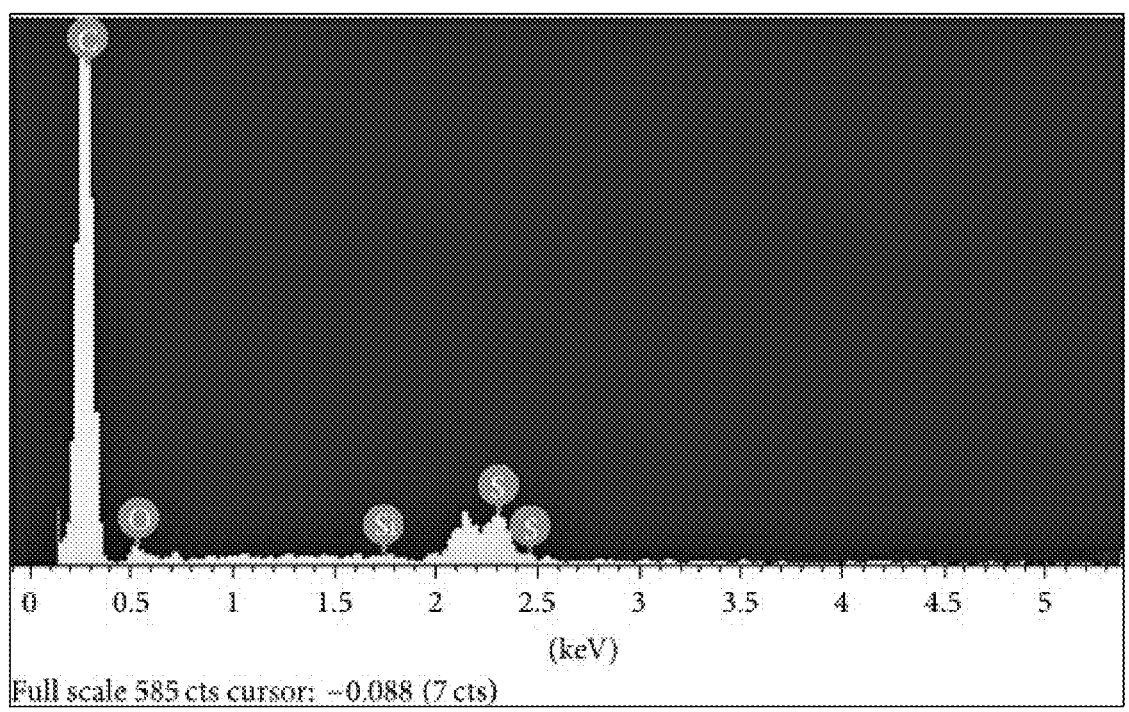
FIG. 4C is an EDX spectrum of AFA.
Figure 4D:
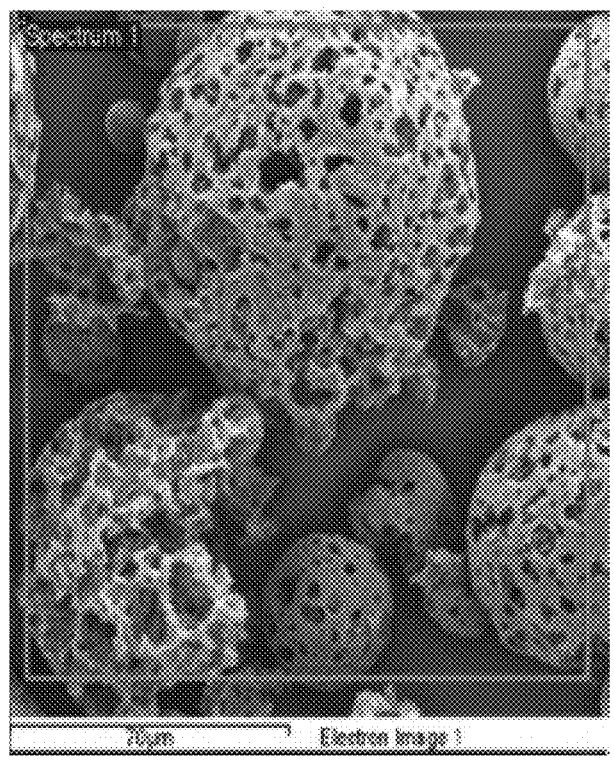
FIG. 4D is the region from which the EDX spectrum of FIG. 4C was sampled.

When RFA was treated with nitric acid (HNO$_3$), most of the heavy metal impurities present in the as-received raw fly ash were removed as shown in the EDX spectrum in FIG. 4C. Moreover, it was observed that more pores were visible as a result of the treatment with nitric acid as shown in FIGS. 4A and 4B compared to the raw fly ash shown in FIGS. 3A and 3B. The spectrum in FIG. 4C reveals that the carbon content increased from 72 to 92% and also reveals an increase in the silicon content from 0.2 to 0.4.

Figure 5B:
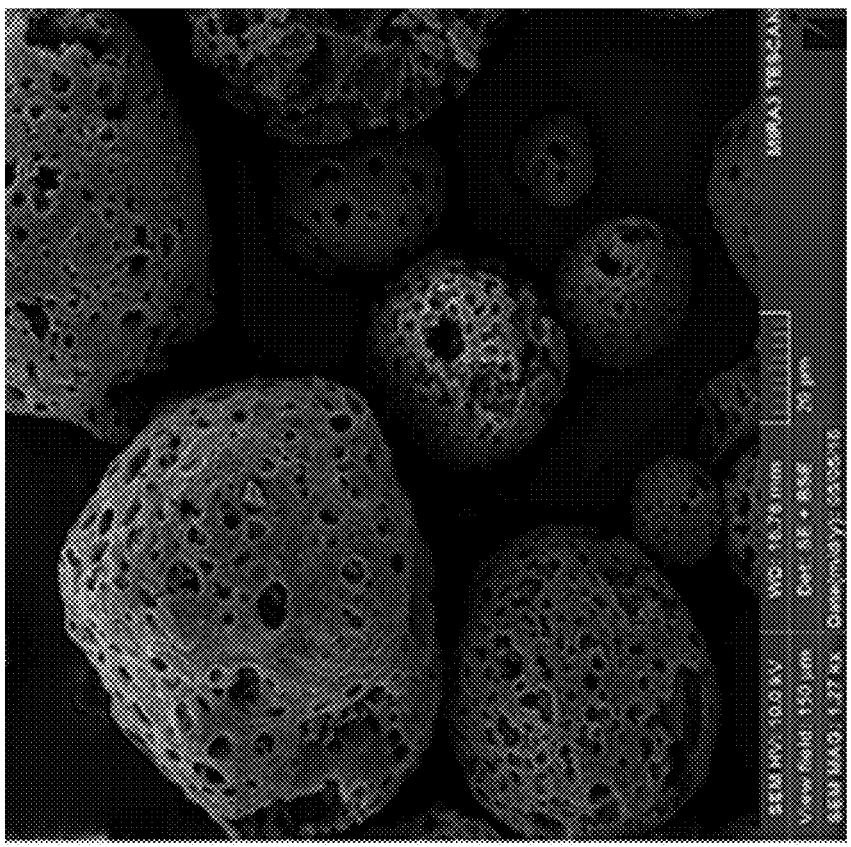
FIG. 5B is another SEM micrograph of PEFA.
Figure 5A:
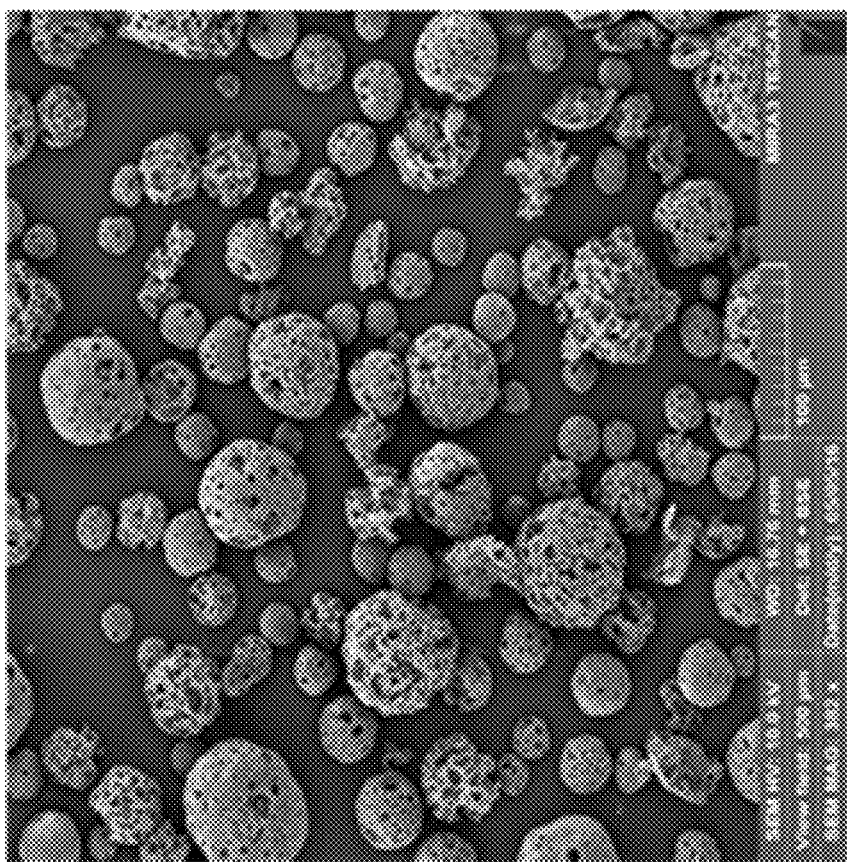
FIG. 5A is an SEM micrograph of polyelectrolyte coated fly ash (PEFA).
Figure 5C:
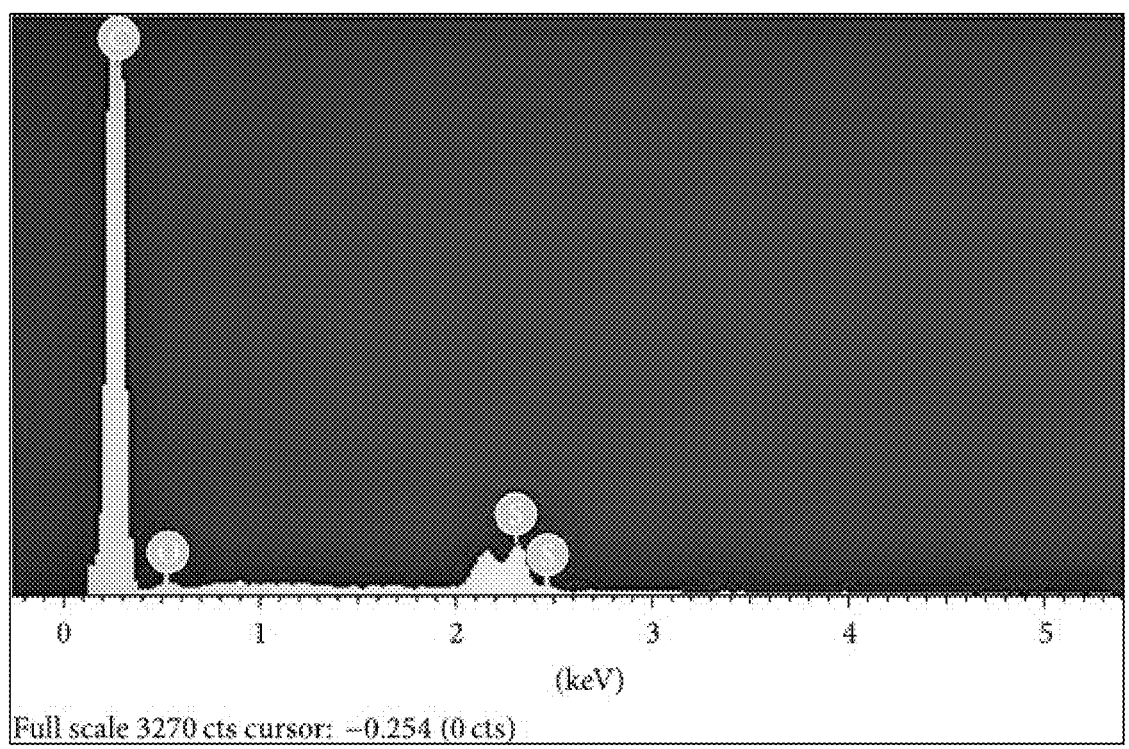
FIG. 5C is an EDX spectrum of PEFA.
Figure 5D:
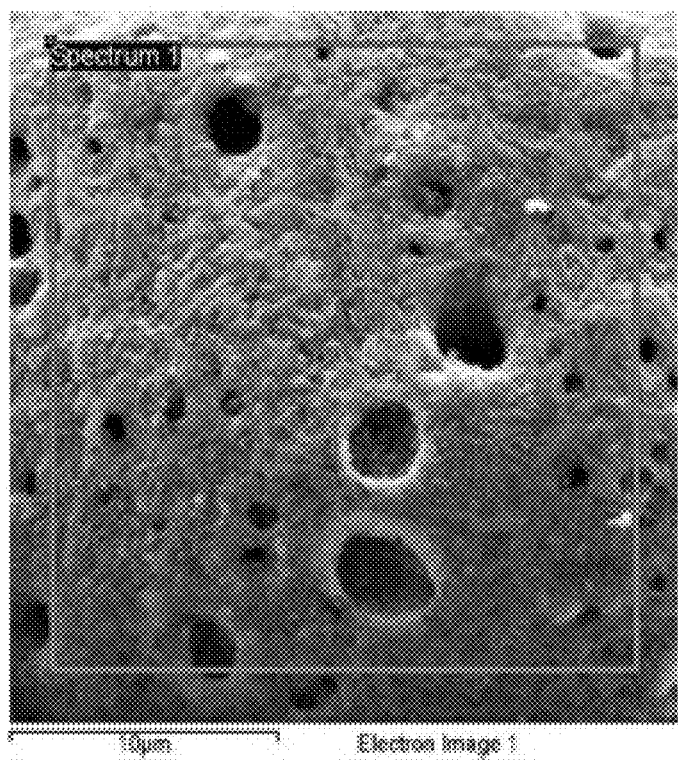
FIG. 5D is the region from which the EDX spectrum of FIG. 5C was sampled.

FIGS. 5A and 5B show the morphology of polyelectrolyte-coated fly ash (PEFA) along with its elemental composition in FIG. 5C. The SEM image shows that a thin pore linen was coated with PDADMAC-PSS, and the EDX spectrum shows an increase in the sulphur content (2.77-5.03%) of the fly ash upon coating with polyelectrolyte. This increase might be due to the component of the polymer that has a polystyrene sulfonate compound (i.e., PSS) in its composition.

Elemental Analysis by X-Ray Fluorescence (XRF) Analysis XRF analysis was carried out to determine the actual elemental composition of the RFA, AFA, and PEFA adsorbents. The results, as summarized in Table 1, identified the presence of some trace metals like vanadium, manganese, iron, nickel, zinc, and molybdenum with their percentage compositions. It was observed that RFA has no silicon content but has a high sulphur content of 51% composition which could be attributed to the fact that the fly ash used in this study is an oil fly ash, received from local power plants operating on liquid fuel. This type of fly ash is usually characterized by low silicon and aluminum content. See Y. S. Al-Degs, A. Ghrir, H. Khoury, G. M. Walker, M. Sunjuk, and M. A. Al-Ghouti, "Characterization and utilization of fly ash of heavy fuel oil generated in power stations," *Fuel Processing Technology*, vol. 123, pp. 41-46, 2014; and S. Vitolo, M. Seggiani, S. Filippi, and C. Brocchini, "Recovery of vanadium from heavy oil and Orimulsion fly ashes," *Hydrometallurgy*, vol. 57, no. 2, pp. 141-149, 2000, each incorporated herein by reference in their entirety. As could be inferred from the EDX spectrum, the fly ash has a high carbonaceous content which is not commonly found at that amount in coal fly ash with high silicon and aluminum contents. See Y. S. Al-Degs et al.; and M. Pires and X. Querol, "Characterization of Candiota (South Brazil) coal and combustion by-product," *International Journal of Coal Geology*, vol. 60, no. 1, pp. 57-72, 2004, each incorporated herein by reference in their entirety. After treatment with acid to produce AFA, the fly ash trace metal content was reduced to a nonsignificant value, whereas the sulphur content increased from 51% to 86% as shown in Table 1. In PEFA, trace metals were either absent or not present in a detectable quantity, but sulphur content increased to 92.5%. This sulphur content increase might be a result of additional sulphate groups present in the polymer coating.

TABLE 1

Elemental composition of RFA, AFA, and PEFA as revealed by XRF.

| Atomic number | Elements | RFA | AFA | PEFA |
|---|---|---|---|---|
| 14 | Silicon (Si) | 0 | 0.76 | 0.00 |
| 15 | Phosphorus (P) | 1.09 | 0.66 | 1.18 |
| 16 | Sulphur (S) | 51.44 | 86.25 | 92.50 |
| 20 | Calcium (Ca) | 1.91 | 2.16 | 2.23 |
| 23 | Vanadium (V) | 20.22 | 5.10 | 1.09 |
| 25 | Manganese (Mn) | 0.1 | 0.00 | 0.00 |
| 26 | Iron (Fe) | 11.34 | 2.10 | 1.29 |
| 28 | Nickel (Ni) | 13.46 | 2.95 | 1.70 |
| 30 | Zinc (Zn) | 0.42 | 0.00 | 0.00 |
| 42 | Molybdenum (Mo) | 0.02 | 0.006 | 0.005 |
|  | Loss on Ignition (LOI) | 0.009 | 0.014 | 0.005 |
|  | Total | 100 | 100 | 100 |

FTIR (Fourier-Transform Infrared) Spectroscopy Analysis

Figure 6:
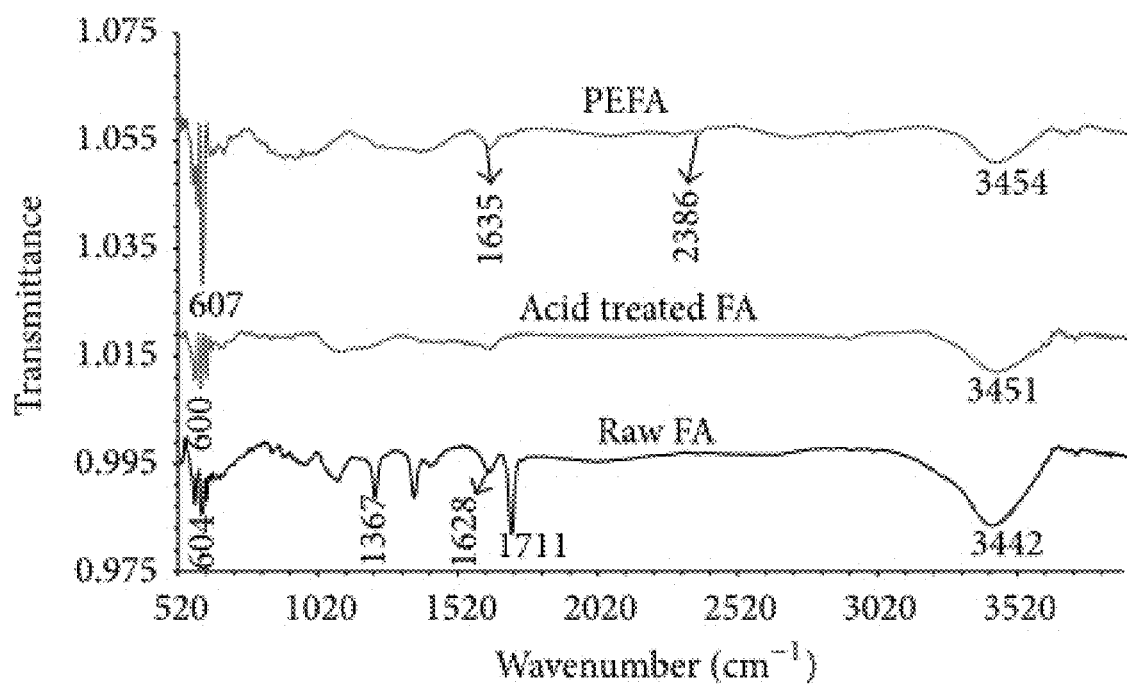
FIG. 6 shows FTIR spectra for raw fly ash (RFA), acid-treated fly ash (AFA), and poly electrolyte coated fly ash (PEFA).

FTIR technique was used to ascertain the functional groups present in the RFA, AFA, and PEFA surfaces. The samples were scanned from 500 to 4000 cm$^{-1}$, and the intensity of peaks in the IR spectra was observed. FIG. 6 shows FTIR spectra for RFA, AFA, and PEFA. The raw fly ash shows a mildly prominent peak at 604 cm$^{-1}$ as a result of the naturally occurring C—S bond. See J. Coates, "Interpretation of infrared spectra, a practical approach interpretation of infrared spectra, a practical approach," *Encycl. Anal. Chem*, pp. 10815-10837, 2000, incorporated herein by reference in its entirety. There was a prominent peak at 1367 cm$^{-1}$ as a result of skeletal vibration of a C—C bond. See M. Anwar Parvez et al., incorporated herein by reference in its entirety. A peak was observed at 1628 cm$^{-1}$, which indicates the presence of a C═C functional group of an alkene. See R. Shawabkeh, O. Khashman, and S. Tarawneh, "Synthesis of activated carbon from spent lubricating oil and application for adsorption of cadmium and lead ions from aqueous solution," *Combined and Hybrid Adsorbents*, J. M. Loure, pp. 195-200, 2006; and R. Shawabkeh, M. J. Khan, A. A. Al-Juhani, H. I. Al-Abdul Wahhab, and I. A. Hussein, "Enhancement of surface properties of waste oil fly ash by chemical treatment," pp. 1-8, Proceedings of the 3rd International Conference on Industrial and hazardous waste management (CRETE'12), 2012, each incorporated herein by reference in their entirety. A sharp peak at 1711 cm$^{-1}$ represents C═O in an ester group as noted by Shawabkeh et al. See R. Shawabkeh, M. J. Khan, A. A. Al-Juhani, H. I. Al-Abdul Wahhab, and I. A. Hussein, "Enhancement of surface properties of oil fly ash by chemical treatment," *Applied Surface Science*, vol. 258, no. 5, pp. 1643-1650, 2011, incorporated herein by reference in its entirety. A broad trough was observed at 3436 cm$^{-1}$ as a result of 0-H stretching of alcoholic groups. See R. Shawabkeh, M. J. Khan, A. A. Al-Juhani, H. I. Al-Abdul Wahhab, and I. A. Hussein, "Enhancement of surface properties of oil fly ash by chemical treatment," *Applied Surface Science*, vol. 258, no. 5, pp. 1643-1650, 2011; and Yaofa Jiang, E. R. Elswick, and M. Mastalerz, "Progression in sulfur isotopic compositions from coal to fly ash: Examples from single-source combustion in Indiana," *International Journal of Coal Geology*, vol. 73, no. 3-4, pp. 273-284, 2008, each incorporated herein by reference in their entirety. However, after treatment with an acid (HNO$_3$), peaks were only seen at lower and higher region of the spectra; this might be a result of the bond breaking due to reactions between the acid and fly ash particles. After coating the AFA with polyelectrolytes (PDADMAC and PSS), a more prominent and sharp peak was observed at 607 cm$^{-1}$ of PEFA which is evident of the presence of more C—S functional groups. The peak of C═C reappeared at 1635 cm$^{-1}$. See F. A. Abuilaiwi et al.; and V. Rathod, H. Pansare, S. A. Bhalerao, and S. D. Maind, "Adsorption and Desorption Studies of Cadmium (II) ions from aqueous solutions onto Tur pod (Cajanus cajan)," *Int. J. Adv. Chem. Res*, vol. 4, no. 5, pp. 30-38, 2015, each incorporated herein by reference in their entirety. Additionally, there was C—N peak at 2386 cm$^{-1}$, which indicates the presence of the polyelectrolytes PDADAMAC on the fly ash. See B. Wang, Q. Li, J. Kang, J. Pang, W. Wang, and J. Zhai, "Preparation and characterization of polypyrrole coating on fly ash cenospheres: role of the organosilane treatment," *Journal of Physics D: Applied Physics*, vol. 44, no. 41, Article ID415301, 2011; and C. Guo, L. Zhou, and J. Lv, "Effects of expandable graphite and modified ammonium polyphosphate on the flame-retardant and mechanical properties of wood flour-polypropylene composites," *Polymers and Polymer Composites*, vol. 21, no. 7, pp. 449-456, 2013, each incorporated herein by reference in their entirety. The peaks observed at 3442 and 3451 $cm^{-1}$ of the RFA and AFA spectra, respectively, were also observed at 3454 $cm^{-1}$ in PEFA indicating the presence of carboxylic acid O—H functional groups.

Phase Identification by X-Ray Diffraction (XRD)

Figure 7:
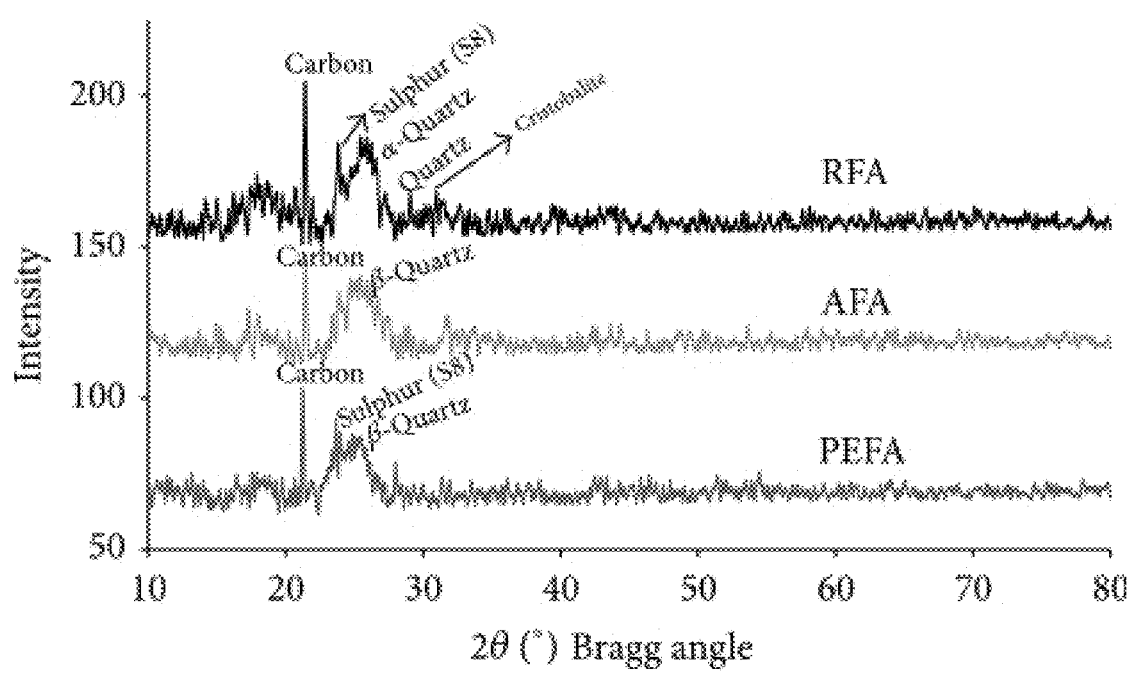
FIG. 7 shows X-ray diffraction spectra for RFA, AFA, and PEFA.

The mineralogical compositions of RFA, AFA, and PEFA were studied using an X-ray diffractometer. Overall, the XRD spectra shown in FIG. 7 show the presence of carbon, sulphur, α-quartz (low quartz content), β-quartz (high quartz content), and cristobalite. A prominent peak was observed at 21.6° 2θ; this confirms the presence of highly concentrated carbon. The amorphous phase between 22° and 28° 2θ contains sulphur and quartz, respectively. A small peak of cristobalite at 31.4° 2θ was observed. Carbon was very prominent through the prepared adsorbents (RFA, AFA, and PEFA). One significant observation was the presence of β-quartz at 27.4° 2θ in both AFA and PEFA, respectively. No significant peaks were observed after 40° 2θ, indicating the presence of amorphous carbon. The XRD pattern of this material can be attributed to that of carbon black or oil fly ash, which are both amorphous. Also, the crystalline structure of oil fly ash is known to consist of carbon and metallic sulphur in the amorphous state. See W. T. Kwon, D. H. Kim, and Y. P. Kim, "Characterization of heavy oil fly ash generated from a power plant," *AZo J. Mater. online*, pp. 1-10, 2005, incorporated herein by reference in its entirety. ence, the fly ash used to prepare PEFA in this study can be referred to as oil fly ash as confirmed from the XRD spectrum.

Thermogravimetric Analysis (TGA)

Figure 8:
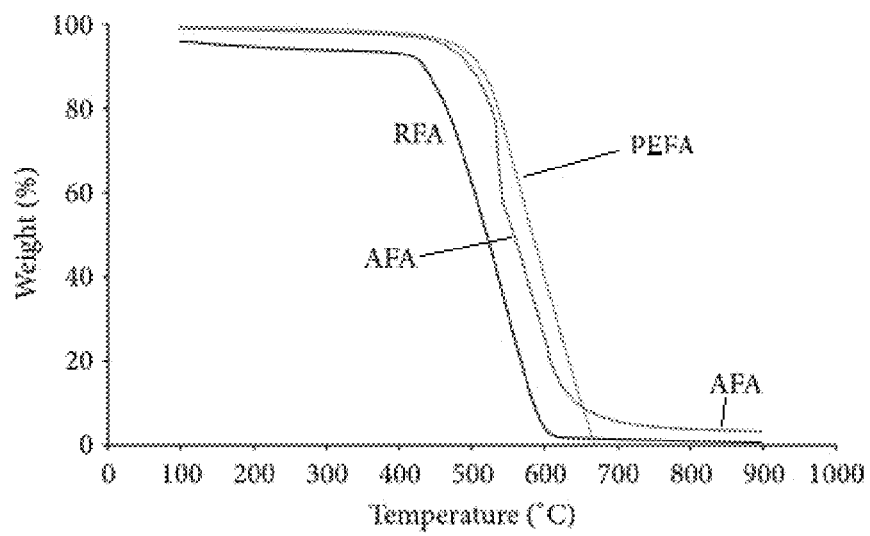
FIG. 8 shows thermogravimetric (TG) measurements of RFA, AFA, and PEFA.

Thermogravimetric analysis was performed to measure the thermal stability and purity of adsorbents. FIG. 8 displays the thermograms of RFA, AFA, and PEFA. All samples analyzed exhibit similar curves and do not contain adsorbed water. Due to volatilization/decomposition of organic or inorganic substances, a 2% weight loss was observed between 100 and 470° C. in RFA. Dramatic weight losses of 84% for RFA between 470 and 600° C., 80% for AFA at temperature range of 580-630° C., and 97% for PEFA between 580 and 670° C., can be attributed to the phenomenon of gas generation ($CO_2$ and CO) upon pyrolysis. See J. Zou, Y. Dai, X. Wang et al., "Structure and adsorption properties of sewage sludge-derived carbon with removal of inorganic impurities and high porosity," *Bioresource Technology*, vol. 142, pp. 209-217, 2013, incorporated herein by reference in its entirety. Among the three adsorbents, AFA seems to be more thermally stable than the rest with a residual of approximately 5%. Other samples burn off almost completely before the maximum set temperature of 900° C.

Example 5

Removal of Cadmium
Effect of pH

Figure 9:
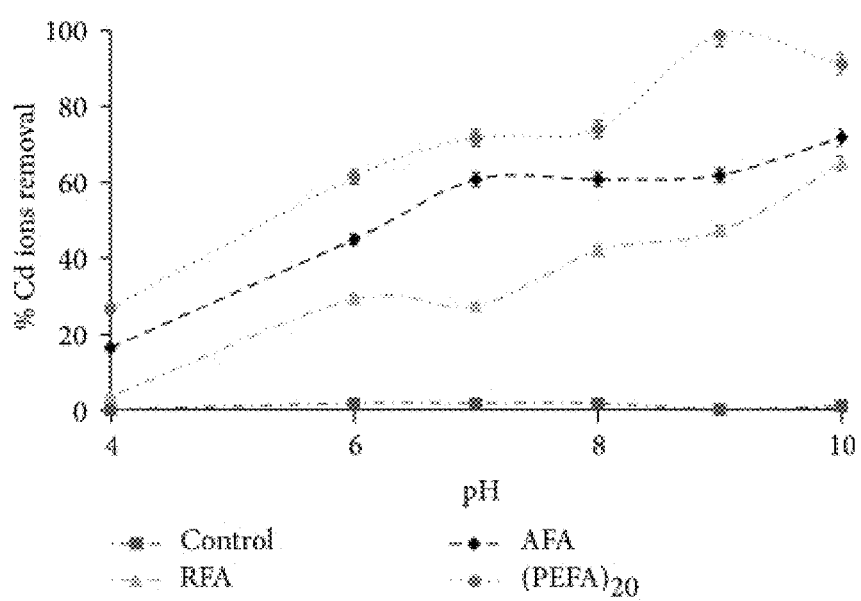
FIG. 9 shows the removal efficiency of Cd(II) by RFA, AFA, and PEFA at different pH values.

Generally, metal adsorption consists of a multifaceted mechanism of ion exchange, metal chelating with numerous anionic functional groups, physical forces sorption, and trapping of ions in the interior sphere of adsorbents' architectural network. See Akpomie et al. Different forms of Cd species occur in deionized water as $Cd^{2+}$, $Cd(OH)_{2(s)}$, and $Cd(OH)^+$. See R. Leyva-Ramos, J. R. Rangel-Mendez, J. Mendoza-Barron, L. Fuentes-Rubio, and R. M. Guerrero-Coronado, "Adsorption of cadmium(II) from aqueous solution onto activated carbon," *Water Sci. Technol*, vol. 35, no. 7, pp. 205-211, 1997, incorporated herein by reference in its entirety. pH was a leading factor affecting Cd(II) ion removal under the investigated conditions. Nonetheless, $Cd^{2+}$ often exists as the complex $[Cd(H_2O)_6]^{2+}$ at low pH, which is also the prevailing species. See Ihsanullah, F. A. Al-Khaldi, B. Abusharkh et al., "Adsorptive removal of cadmium(II) ions from liquid phase using acid modified carbon-based adsorbents," *Journal of Molecular Liquids*, vol. 204, pp. 255-263, 2015, incorporated herein by reference in its entirety. With a specific focus on PEFA, the adsorption of Cd(II) ions by RFA, AFA, and PEFA was investigated at pH 4-10 to find the effect of pH. FIG. 9 illustrates an increase in Cd(II) removal efficiency with increased pH in aqueous solution with other parameters fixed at 2 mg/L of metal ion concentration, 4 g/L of adsorbent dosage, 50 mL volume of aqueous solution, mixing rate of 150 rpm, contact time of 15 min, and temperature of 298 K. Maximum sorption of Cd ion was attained at pH 9 due to the fact that in acidic medium, Cd(II) ion sorption is low as a result of available large number of hydrogen ions ($H^+$), which outcompete Cd ions for active sites. However, as the pH increases, the number of positively charged ions available for active sites reduces with a rise in negatively charged ions for binding. See Rathod et al. Moreover, the sudden increase and decrease in the removal efficiency as observed in FIG. 9 suggest an elaborate process of exchanging ions, sorption driven by physical forces, metal chelation, and trapping of ions in the internal sphere of the structural arrangement of the adsorbents. See G. H. Pino, L. M. SouzaDeMesquita, M. L. Torem, and G. A. S. Pinto, "Biosorption of cadmium by green coconut shell powder," *Minerals Engineering*, vol. 19, no. 5, pp. 380-387, 2006, incorporated herein by reference in its entirety.

Effect of Contact Time

Figure 10:
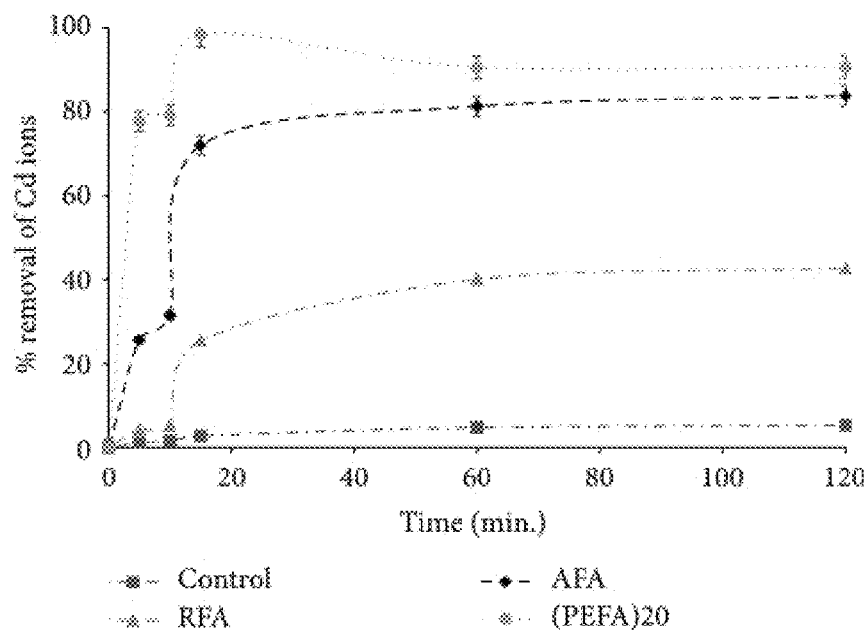
FIG. 10 shows the removal efficiency of Cd(II) by RFA, AFA, and PEFA at different contact times.

Contact time is the time required for equilibrium to be attained in the process of adsorption when no substantial variations are detected in adsorptive concentration after a definite period of time. See Rathod et al. It hinges on the surface features of the adsorbent in question. To find the optimum contact time for Cd(II) ions uptake, varying contact times from 5 min to 2 h were studied from aqueous solutions of 2 mg/L Cd(II) ions concentration, adsorbent mass of 4 g/L, pH value of 9, mixing rate of 150 rpm, and 298 K temperature. The results obtained indicated that at first there was rapid adsorption of Cd(II) ions for PEFA with 98% removal and a gradual decrease to attain equilibrium in 2 h as shown in FIG. 10. Initial fast adsorption for this adsorbent might be a result of rich active sites on the adsorbent surface which become filled up with increasing time, and turn out to be saturated. See Akpomie et al.; Rathod et al.; and K. Akpomie and F. Dawodu, "Physico-chemical analysis of automobile effluent before and after treatment with an alkaline-activated montmorillonite," *Journal of Taibah University for Science*, vol. 9, no. 4, pp. 465-476, 2015, each incorporated herein by reference in their entirety. Moreover, the decline in the removal efficiency could be attributed to the presence of metal impurities (V, Mn, Fe, Ni, Mo, and Zn) as revealed by XRF in Table 1, which might have occupied the active site needed for sorption. For this study, optimum contact time was chosen to be 15 min as maximum Cd ions removal was reached at this time. Percent removal for RFA and AFA was 25 and 72%, respectively, at the chosen optimum contact time.

Effect of Adsorbent Dosage

Figure 11:
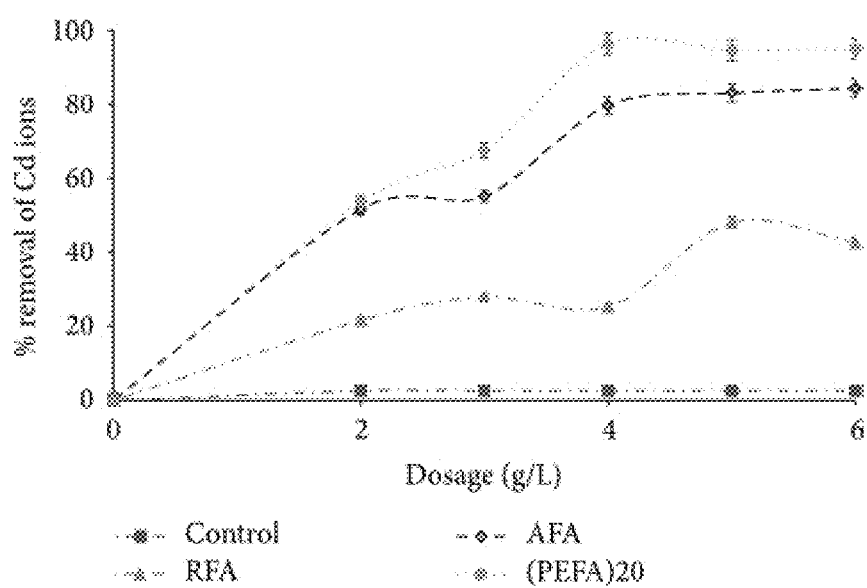
FIG. 11 shows the removal efficiency of Cd(II) by RFA, AFA, and PEFA at different adsorbent concentrations.

The mass of adsorbent has an effect on the active sites available for binding of Cd(II) ions in aqueous solution. See Asmaly et al.; and K. Akpomie and F. Dawodu, "Physicochemical analysis of automobile effluent before and after treatment with an alkaline-activated montmorillonite," *Journal of Taibah University for Science*, vol. 9, no. 4, pp. 465-476, 2015, each incorporated herein by reference in their entirety. In this study, batch mode experiments were conducted by applying varying quantities of RFA, AFA, and PEFA from 1 to 6 g/L at pH value of 9, 2 mg/L metal ion concentration, 150 rpm mixing rate, 15 min contact time, 50 mL volume of aqueous solution, and 298 K temperature. As illustrated in FIG. 11, Cd(II) ion sorption rises with an increase in dose of adsorbents until 4 g/L, and there was little or no significant adsorption for remaining dosage. Sorption increase with an increase in dose of adsorbent could be attributed to surface area increase, the rise in the exchange site ability of the ion, and an increase in active sites. See Gupta et al.; Olabemiwo; Rathod et al.; and M. A. Atieh, "Removal of phenol from water different types of carbon—a comparative analysis," *Procedia—Soc. Behav. Sci.*, vol. 10, pp. 136-141, 2014, each incorporated herein by reference in their entirety. PEFA reaches highest sorption at 4 g/L unlike RFA and AFA with 5 g/L and 6 g/L as well as removal efficiencies of 48 and 84%, respectively. Incomplete adsorbent aggregation, which leads to a decline in Cd ion uptake active surface area, may be the reason for the drop in removal efficiency at higher concentration for RFA. 4 g/L adsorbent dose was used for other investigations.

Effect of Mixing Rate

Figure 12:
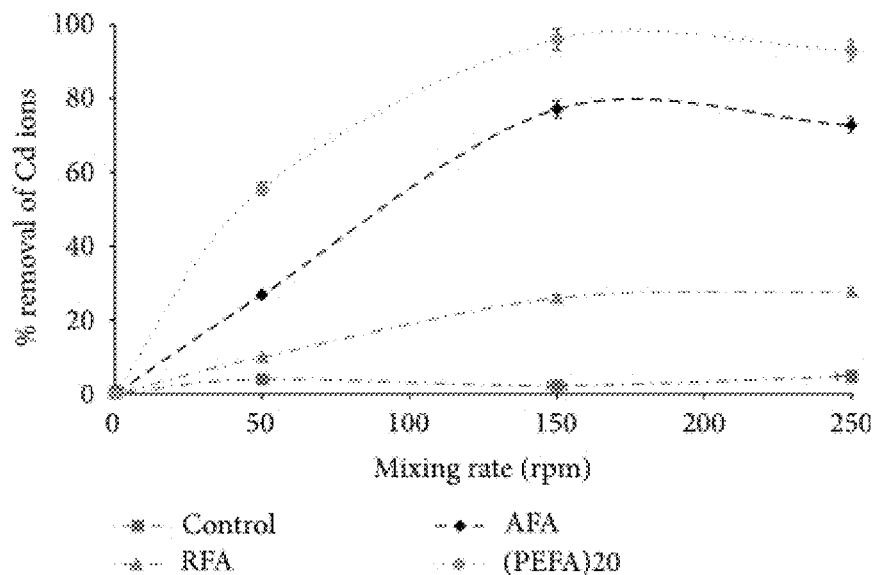
FIG. 12 shows the removal efficiency of Cd(II) by RFA, AFA, and PEFA at different mixing rates.

The mixing rate ensures that Cd(II) ions are transferred to the active sites by supporting the contact between Cd ions in aqueous solution and adsorbent binding sites. See Atieh. The optimum removal of Cd(II) at a pH value of 9 was used to investigate the effect of mixing rate on the adsorption of Cd(II) ion for RFA, AFA, and PEFA. FIG. 12 indicates that the removal of Cd ion increases with mixing rate increase from 50 to 150 rpm. Maximum removal of over 96% was achieved for PEFA, 77% for AFA, and 27% for RFA at 150 rpm with 2 mg/L metal ion concentration, 50 mL volume of aqueous solution, 4 g/L dose of adsorbents, pH value of 9, contact time of 15 min, and 298 K temperature. Afterwards, there was no significant removal achieved above this mixing rate under similar conditions. This observation could be ascribed to improved interaction between the sorption-active sites and Cd ions in aqueous solution with an increase mixing rate. See Asmaly et al. The value of 150 rpm was chosen as the mixing rate to use.

Effect of Initial Concentrations

Figure 13:
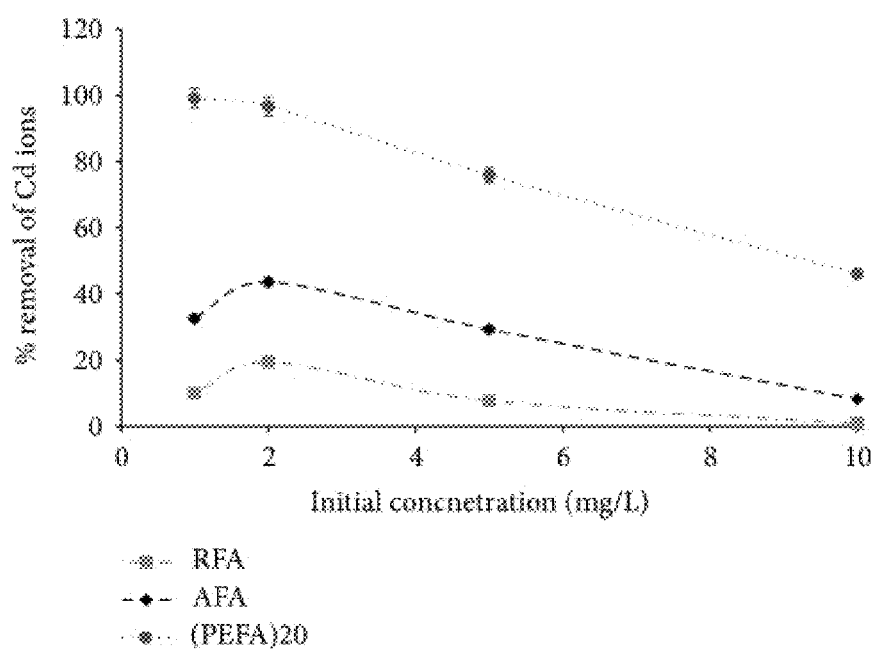
FIG. 13 shows the removal efficiency of Cd(II) by RFA, AFA, and PEFA at different initial Cd(II) concentrations.

Investigating the initial concentration of metal ion is essential in the sorption studies because water and wastewater contamination have diverse metal ion concentrations; hence, knowledge of its influence is required for an elaborate sorption investigation. See Akpomie et al. The effect of Cd ion concentration in aqueous solution on its sorption by RFA, AFA, and PEFA was conducted with a 4 g/L dose of adsorbent, pH value of 9, 150 rpm mixing rate, 15 min contact time, and 298 K temperature. Initial Cd ions concentrations investigated were varied from 1 to 10 mg/L and their effects on the removal efficiency were established. In FIG. 13, it was observed that increasing the initial concentration of Cd(II) ions in solution could cause a decline in the removal efficiency of RFA, AFA, and PEFA. This can be ascribed to bulky quantities of Cd(II) ion with inadequate active sites on the surface of the adsorbents which resulted in increased concentration of Cd(II) ion in the greater part of the aqueous solution, and as a result, decreasing Cd ion removal efficiency. See Akpomie et al. and Asmaly et al.

Effect of Temperature

Figure 14A:
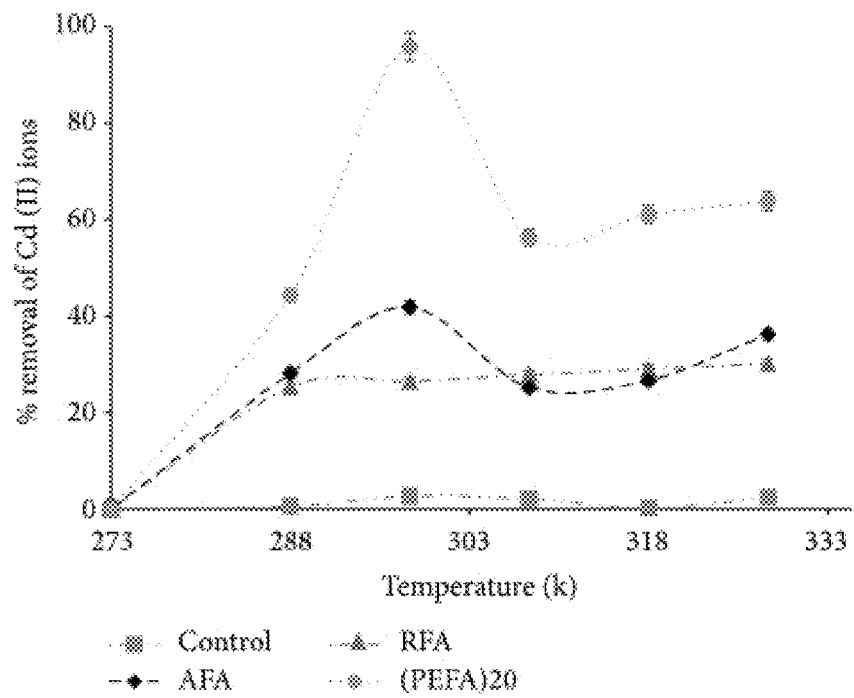
FIG. 14A shows the removal efficiency of Cd(II) by RFA, AFA, and PEFA at different temperatures.

FIG. 14A illustrates Cd ion sorption on RFA, AFA, and PEFA at different temperatures. It can be deduced from the graph that an initial rise in temperature brings about a sharp increase in Cd(II) sorption from 273 to 298 K. See Rathod et al. and G. C. Catena and F. V. Bright, "Thermodynamic study on the effects of β-cyclodextrin inclusion with anilinonaphthalenesulfonates," *Analytical Chemistry*, vol. 61, no. 8, pp. 905-909, 1989, each incorporated herein by reference in their entirety. This observation could be attributed to the fact that more chemical sites were present as temperature rises from 288 to 298 K to surface component dissociation on PEFA. This also suggests that the adsorption mechanism of Cd(II) ion on PEFA could be chemical sorption in addition to physical sorption as observed for RFA in which sorption increases with an increase in temperature. After a drop in removal efficiency at 308 K, there was a steady increase up until 328 K, suggesting that a high temperature might be a favorable factor in the sorption process as well and indicating that the adsorption is endothermic. See Akpomie et al. and Rathod et al.

To assess the feasibility and spontaneity of sorption process, thermodynamic parameters like $\Delta G°$ (free energy change), $\Delta H°$ (enthalpy change), and $\Delta S°$ (entropy change) were determined as shown in Table 2. Gibbs free energy change of sorption was calculated from the following equation:

$$\Delta G° = -RT \ln K_d, \quad (10)$$

where R is 8.314 J/mol·K, T (K) is the absolute temperature, and $K_d$ is the distribution coefficient expressed as $K_d = q_e/C_e$, where $q_e$ is the amount of Cd ion adsorbed at equilibrium and $C_e$ is the concentration of Cd ion in aqueous solution at equilibrium.

$$\ln K_d = -\frac{\Delta G°}{RT} \quad (11)$$

$$\ln K_d = -\frac{\Delta H°}{RT} + \frac{\Delta S°}{R}. \quad (12)$$

Figure 14B:
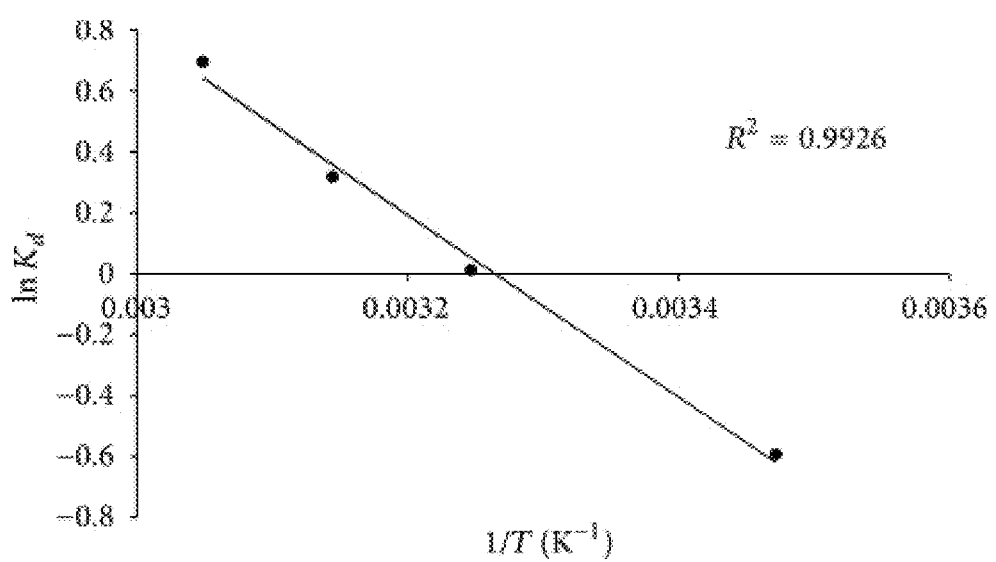
FIG. 14B shows the Van Hoff plot for Cd ion sorption by PEFA at pH value of 9, 2 mg/L metal ion concentration, 150 rpm mixing rate, contact time of 15 min, 4 g/L adsorbent dosage, and 50 mL volume of aqueous solution

Equation (12) is known as the Van Hoff equation; the values of $\Delta H°$ and $\Delta S°$ were calculated from slope and intercept of the plot of $\ln K_d$ against $T^{-1}(K^{-1})$ as indicated in FIG. 14B.

TABLE 2

Thermodynamic parameters for Cd(II) ions adsorption by polyelectrolyte-coated fly ash (PEFA).

| T (K) | $K_d$ | $\Delta G°$ (KJ/mol) | $\Delta H°$ (KJ/mol) | $\Delta S°$ (J/mol · K) |
|---|---|---|---|---|
| 288 | 0.55306 | 1.41818 | 24.80814 | 80.98418 |
| 298 | 4.12617 | −3.5116 | | |
| 308 | 1.01149 | −0.0293 | | |

TABLE 2-continued

Thermodynamic parameters for Cd(II) ions adsorption by polyelectrolyte-coated fly ash (PEFA).

| T (K) | $K_d$ | $\Delta G°$ (KJ/mol) | $\Delta H°$ (KJ/mol) | $\Delta S°$ (J/mol · K) |
|---|---|---|---|---|
| 318 | 1.37544 | −0.8428 | | |
| 328 | 2.00362 | −1.8951 | | |

Example 6

Isotherm and Kinetic Studies
Langmuir and Freundlich Isotherm Models

Figure 15A:
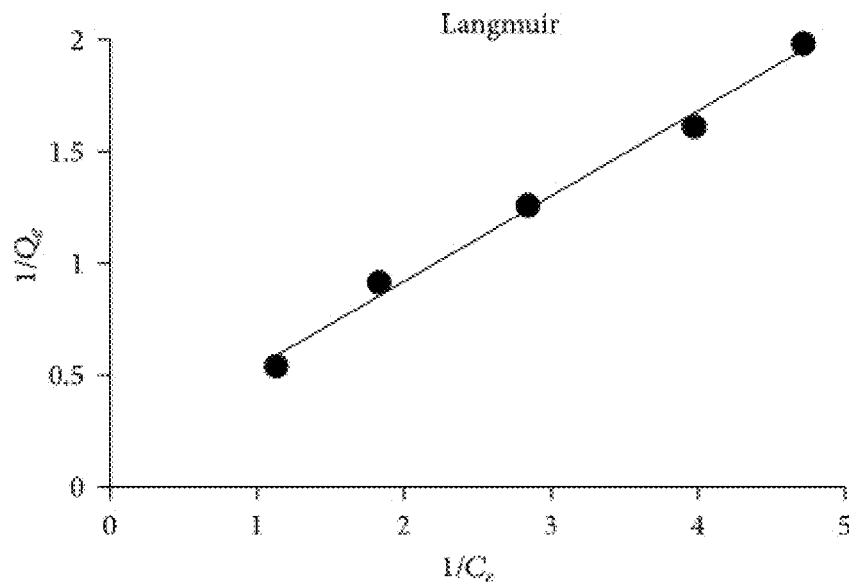
FIG. 15A shows Cd(II) adsorption data plotted to a Langmuir adsorption isotherm model.
Figure 15B:
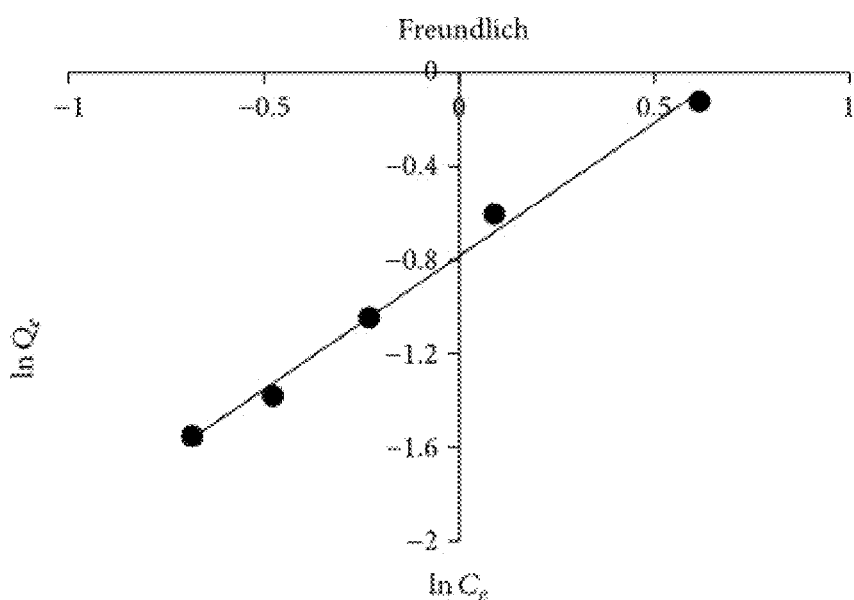
FIG. 15B shows Cd(II) adsorption data plotted to a Freundlich adsorption isotherm model.

In order to determine the maximum sorption capacities of PEFA, data recorded at equilibrium for sorption experiment were employed. FIGS. 15A and 15B illustrate Langmuir and Freundlich isotherm models for Cd(II) at pH 9. The maximum sorption capacity and adsorption intensity values were calculated from the slope and intercept of the plots between $1/q_e$ and $1/C_e$ for Langmuir as in $q_m$ and $K_L$ and between ln $q_e$ and ln $C_e$ for Freundlich as in $K_f$ and n, respectively. See Langmuir and G. McKay, Y. S. Ho, and J. C. Y. Ng, "Biosorption of copper from waste waters: A review," *Separation and Purification Methods*, vol. 28, no. 1, pp. 87-125, 1999, each incorporated herein by reference in their entirety. Table 3 shows the correlation coefficient values ($R^2$) for both Langmuir and Freundlich as well as other parameters. This implies that both models fit well the experimental data. Nonetheless, the important features of Langmuir parameters can be applied to further forecast the interaction between the adsorbate and adsorbent with the aid of dimensionless separation parameters ($R_L$) as indicated in the following equation:

$$R_L = \frac{1}{1 + K_L C_i}, \quad (13)$$

where $K_L$ is Langmuir constant and $C_i$ is Cd(II) ion initial concentration. $R_L$ value gives essential information on sorption nature. $R_L$ value for this study as shown in Table 3 indicates a favorable adsorption process ($R_L$<1) for 2 mg/L Cd(II) ion concentration. See Akpomie et al; Rathod et al.; and McKay et al. Adsorption of PEFA can also be explained in terms of surface area coverage in contrast to initial concentration of Cd ion. See Rathod et al. Langmuir model for surface area coverage of adsorbent surface can be illustrated with aid of the following equation:

$$K_L C_i = \frac{\theta}{1-\theta}, \quad (14)$$

where θ is the surface area coverage of adsorbent surface as indicated in Table 3.

Kinetic Studies of Adsorption

As indicated in (7), (8), and (9), kinetic studies of sorption data were evaluated by different kinetic models like pseudo-1st-order model, pseudo-2nd-order model, and intraparticle diffusion. See Leyva-Ramos et al.; McKay et al.; and W. J. Weber, *Physicochemical processes for water quality control*, Wiley-Interscience, New York, N.Y., USA, 1972, each incorporated herein by reference in their entirety. Sorption of cadmium ions was supervised at different period of time. Sorption of Cd(II) ions was calculated from data acquired. To determine the appropriate kinetic model, Cd(II) ion adsorption was plotted against time. These data were fitted into pseudo-1st-order, pseudo-2nd-order, and Weber intraparticle diffusion equations. See Leyva-Ramos et al. Table 4 shows that values of $q_e$ and $K_i$ were calculated from $K_i$ (Slope) and ln $q_e$ (intercept) of plot ln($q_e-q_t$) versus t. The correlation coefficient value ($R^2$=0.9802) for pseudo-1st-order model was lower than that of pseudo-2nd-order model. This could be linked to the fact that sorption kinetics take place chemically and involve forces of valency via ions sharing or electron exchange between adsorbent and the adsorbed ions on PEFA. See Akpomie et al. and C. Septhum, S. Rattanaphani, J. B. Bremner, and V. Rattanaphani, "An adsorption study of Al(III) ions onto chitosan," *Journal of Hazardous Materials*, vol. 148, no. 1-2, pp. 185-191, 2007, each incorporated herein by reference in their entirety. Values of $q_e$ and $K_2$ were calculated from $q_e$ and $1/q_e$ (slope) and $1/K_2 q_{e2}$ (intercept) of the plot. The correlation ($R^2$=0.9999) for the pseudo-2nd-order model was very strong, pointing towards the fact that sorption of cadmium ions occurred on a monolayer mode, with the assumption that the rate limiting factor could be chemical sorption. See Rathod et al. This indicated that the cadmium ions were chemically bonded to definite active sites on the surface of PEFA. Weber and Morris' intraparticle diffusion equation was also plotted for $q_t$ against $t^{1/2}$. See Weber. Values of $K_i$ and C were calculated from $K_i$ (slope) and C (intercept) as shown in Table 4. Its correlation value ($R^2$=0.8365) was the lowest, and the plot intercept did not pass through the origin, pointing towards some control of boundary layers and suggesting that intraparticle pore diffusion is not the only rate limiting factor. See Rathod et al. The intraparticle diffusion equation plot highlights multilinearity, indicating a three stage process. The initial sharper part is linked to the diffusion of Cd(II) ions via the solution to the external surface of PEFA or boundary layer diffusion of solid molecules. See Rathod et al. The second part gives description of ion phase, where intraparticle diffusion is a rate limiting factor. The third part is ascribed to the final equilibrium phase. Nonetheless, the intercept of the plot (not shown) fails to pass through the origin, which may be attributed to the difference in the rate of mass transfer in the initial and final phases of sorption. See G. Prasad, K. K. Pandey, and V. N. Singh, "Mixed adsorbents for Cu(II) removal from aqueous solutions," *Environmental Technology Letters*, vol. 7, no. 1-12, pp. 547-554, 1986, incorporated herein by reference in its entirety.

TABLE 3

Langmuir and Freundlich constants for Cd(II) ion uptake.

| | Langmuir constants | | | | Freundlich constants | | |
|---|---|---|---|---|---|---|---|
| | $R^2$ | $K_L$ | $Q_{max}$ | $R_L$ | $R^2$ | $K_f$ | 1/n |
| PEFA | 0.9918 | 0.4101 | 6.3939 | 0.4714 | 0.5286 | 0.9924 | 0.4568 | 0.878 |

TABLE 4

Sorption kinetics parameters for Cd (II) ion adsorption by PEFA.

| | Pseudo-1st-order | | | Pseudo-2nd-order | | | Intraparticle diffusion | | |
|---|---|---|---|---|---|---|---|---|---|
| | $q_e$ | $K_1$ | $R^2$ | $q_e$ | $K_1$ | $R^2$ | $q_e$ | $K_1$ | $R^2$ |
| PEFA | 148.9 | 0.0619 | 0.9802 | 0.6052 | 4.2983 | 0.999 | 0.0046 | 0.8413 | 0.8365 |

These experiments have demonstrated that polyelectrolyte-coated fly ash (PEFA) performed as an excellent adsorbent for Cd(II) ion in aqueous solution. Adsorption of Cd(II) on PEFA surface was dependent on the dosage of adsorbent, pH of the aqueous solution, contact time, Cd(II) initial concentration, and temperature. Optimum conditions for Cd ions removal were found to be at an adsorbent dose of 4 g/L, pH value of 9, 15 min contact time, mixing rate of 150 rpm, 2 mg/L Cd initial concentration, and 298 K temperature. The maximum sorption capacity of PEFA was achieved at 6.40 mg/g with the experimental data fitting well to both Langmuir and Freundlich isotherm models and following pseudo-2nd-order kinetics. The investigation of thermodynamic parameters suggested that the adsorption of Cd(II) ions interaction with PEFA was endothermic, spontaneous, and increased the disorderliness of the solute solution interface. This research highlights that fly ash, an otherwise hazardous industrial waste, has a great potential in water treatment applications.

The invention claimed is:

1. A polyelectrolyte coated fly ash, comprising:
an acid-treated fly ash particle;
a first layer of a positive polyelectrolyte, the first layer in contact with the acid-treated fly ash particle; and
a second layer of a negative polyelectrolyte, the second layer in contact with the first layer,
wherein the polyelectrolyte coated fly ash is in the form of porous particles having an average particle diameter of 15-100 μm and an average pore diameter of 0.5-10 μm.

2. The polyelectrolyte coated fly ash of claim 1, wherein the acid-treated fly ash particle is derived from an oil fly ash.

3. The polyelectrolyte coated fly ash of claim 1, wherein the first layer and the second layer each independently have an average thickness of 0.5-10 nm.

4. The polyelectrolyte coated fly ash of claim 1, further comprising alternating layers of positive polyelectrolyte and negative polyelectrolyte, for a total of at least 4 layers.

5. The polyelectrolyte coated fly ash of claim 1, wherein the positive polyelectrolyte comprises a heterocyclic amine monomer.

6. The polyelectrolyte coated fly ash of claim 5, wherein the positive polyelectrolyte is poly(diallyldimethylammonium chloride).

7. The polyelectrolyte coated fly ash of claim 1, wherein the negative polyelectrolyte comprises a sulfonate monomer.

8. The polyelectrolyte coated fly ash of claim 7, wherein the negative polyelectrolyte is polystyrene sulfonate.

9. A method of making the polyelectrolyte coated fly ash of claim 1, comprising:
refluxing an oil fly ash in an inorganic acid 6-36 hours to produce a refluxed mixture;
washing and drying the refluxed mixture to produce an acid-treated fly ash;
mixing the acid-treated fly ash with a first aqueous solution of the positive polyelectrolyte to produce a fly ash with the first layer; and
mixing the fly ash with the first layer with a second aqueous solution of the negative polyelectrolyte to produce the polyelectrolyte coated fly ash.

10. The method of claim 9, wherein the oil fly ash comprises porous particles having an average pore diameter of 0.5-12 μm.

11. The method of claim 9, wherein the first aqueous solution and the second aqueous solution do not comprise an additional electrolyte.

12. A method of reducing a contaminant concentration from an aqueous solution with the polyelectrolyte coated fly ash of claim 1, comprising:
mixing the polyelectrolyte coated fly ash with the aqueous solution comprising the contaminant at a contaminant concentration of 0.5-50 mg/L,
wherein a concentration of the polyelectrolyte coated fly ash in the aqueous solution after the mixing is 1-10 g/L,
wherein the polyelectrolyte coated fly ash reduces the contaminant concentration in the aqueous solution by adsorption.

13. The method of claim 12, wherein the contaminant is at least one metal selected from the group consisting of Cd, Pb, Cr, Se, Hg, As, Mn, Ni, Cu, Zn, Ag, Tl, and Sb.

14. The method of claim 12, wherein at least 90 wt % of the contaminant is adsorbed by the polyelectrolyte coated fly ash in at least 20 minutes.

15. The method of claim 12, wherein the aqueous solution has a pH of 8-10.

16. The method of claim 12, wherein the polyelectrolyte coated fly ash has an adsorption capacity of 0.5-200 mg of the contaminant per g of the polyelectrolyte coated fly ash.

17. The method of claim 12, wherein the mixing involves stirring or agitating the polyelectrolyte coated fly ash in the aqueous solution at a rate of 130-200 rpm.

18. The method of claim 12, further comprising:
removing the polyelectrolyte coated fly ash from the aqueous solution to produce a recovered polyelectrolyte coated fly ash;
mixing the recovered polyelectrolyte coated fly ash with an acidic solution;
drying the acidic solution to produce a cleaned polyelectrolyte coated fly ash; and
reusing the cleaned polyelectrolyte coated fly ash, which maintains an adsorption capacity for at least 5 purification cycles.

19. The method of claim 18, wherein the acidic solution comprises one or more inorganic acids at a total concentration of 0.05-0.5 M.

* * * * *